United States Patent
Sumi et al.

(10) Patent No.: US 9,520,815 B2
(45) Date of Patent: Dec. 13, 2016

(54) CONTROL DEVICE OF ELECTRIC SEALED COMPRESSOR, ELECTRIC SEALED COMPRESSOR APPARATUS, AND HOME APPLIANCE COMPRISING CONTROL DEVICE AND ELECTRIC SEALED COMPRESSOR APPARATUS

(71) Applicant: Panasonic Intellectual Property Management Co., Ltd., Osaka-shi, Osaka (JP)

(72) Inventors: Masaki Sumi, Kyoto (JP); Shigetomi Tokunaga, Shiga (JP); Hiroaki Kase, Shiga (JP); Masamitsu Taura, Osaka (JP); Mitsuhiro Fukuda, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 14/414,037

(22) PCT Filed: Jul. 8, 2013

(86) PCT No.: PCT/JP2013/004220
§ 371 (c)(1),
(2) Date: Jan. 9, 2015

(87) PCT Pub. No.: WO2014/010225
PCT Pub. Date: Jan. 16, 2014

(65) Prior Publication Data
US 2015/0214863 A1    Jul. 30, 2015

(30) Foreign Application Priority Data

Jul. 9, 2012 (JP) .................................. 2012-153275
Sep. 19, 2012 (JP) .................................. 2012-205263

(Continued)

(51) Int. Cl.
  H02P 3/02 (2006.01)
  H02M 1/32 (2007.01)
  (Continued)

(52) U.S. Cl.
  CPC ................ H02P 3/02 (2013.01); F04B 35/04 (2013.01); F04B 49/06 (2013.01); H02H 7/0844 (2013.01);
  (Continued)

(58) Field of Classification Search
  CPC .................................... H02M 7/06; H02P 3/02
  (Continued)

(56) References Cited

U.S. PATENT DOCUMENTS 6,381,110 B1 * 4/2002 Nagashima ........... B60L 3/0023
                                                                361/23
8,390,341 B2 * 3/2013 Sugie ................... H03K 17/687
                                                                327/108

(Continued)

FOREIGN PATENT DOCUMENTS

CN    201496244 U    6/2010
CN    102022313      4/2011
(Continued)

OTHER PUBLICATIONS

Office Action issued in corresponding Chinese Application No. 201380036234.5, Jan. 4, 2016, 18 pages with translation.

*Primary Examiner* — Bentsu Ro
*Assistant Examiner* — Said Bouziane
(74) *Attorney, Agent, or Firm* — Hamre, Schumann, Mueller & Larson, P.C.

(57) ABSTRACT

A control device (100) of an electric sealed compressor of the present invention comprises a power converter (30) which supplies electric power to an electric motor (5) of the electric sealed compressor; a driving circuit (27) which (Continued)

drives the power converter (30); abnormality detector (40) which detects abnormality in an abnormality detection region including the power converter (30) and the driving circuit (27); a controller (11) configured to output a control signal for driving the power converter to the driving circuit (27) and stop outputting the control signal in response to a signal (Fo signal) output from the abnormality detector (40), the signal indicating that the abnormality has been detected; and an auxiliary protection circuit (50) configured to deactivate the driving circuit (27) in response to the signal output from the abnormality detector (40), the signal indicating that the abnormality has been detected.

30 Claims, 13 Drawing Sheets

(30) Foreign Application Priority Data

Dec. 27, 2012 (JP) .................................. 2012-284174
Mar. 14, 2013 (JP) .................................. 2013-051334

(51) Int. Cl.
| | | |
|---|---|---|
| H02M 7/5387 | (2007.01) | |
| F04B 35/04 | (2006.01) | |
| F04B 49/06 | (2006.01) | |
| H02H 7/08 | (2006.01) | |
| H02H 7/09 | (2006.01) | |
| H02H 1/00 | (2006.01) | |

(52) U.S. Cl.
CPC ........... *H02M 1/32* (2013.01); *H02M 7/53875* (2013.01); *H02P 29/0241* (2016.02)

(58) Field of Classification Search
USPC .......................................................... 318/783
See application file for complete search history.

(56) References Cited

U.S. PATENT DOCUMENTS

| | | | | |
|---|---|---|---|---|
| 2001/0019249 A1* | 9/2001 | Kato | ................. | H02M 7/53871 318/400.06 |
| 2001/0048285 A1* | 12/2001 | Furukawa | ............... | F04B 35/04 318/783 |
| 2005/0196285 A1* | 9/2005 | Jayanth | ................. | F04C 23/008 417/44.11 |
| 2005/0264217 A1* | 12/2005 | Huston | ............... | B60L 11/1816 315/77 |
| 2009/0285001 A1* | 11/2009 | Hu | ......................... | H02M 1/08 363/126 |
| 2010/0018243 A1 | 1/2010 | Tanaka et al. | | |
| 2011/0199035 A1* | 8/2011 | Ooto | ....................... | H02P 27/08 318/478 |
| 2013/0039108 A1* | 2/2013 | Watanabe | ............... | H02M 7/48 363/131 |
| 2013/0107401 A1* | 5/2013 | Helt | ......................... | H02H 7/09 361/33 |

FOREIGN PATENT DOCUMENTS

| | | |
|---|---|---|
| JP | 2000-032767 | 1/2000 |
| JP | 2000032767 A * | 1/2000 |
| JP | 2000-224861 | 8/2000 |
| JP | 2004-304924 | 10/2004 |
| JP | 2008-215235 | 9/2008 |
| WO | WO 2010/044243 | 4/2010 |

* cited by examiner

CONTROL DEVICE OF ELECTRIC SEALED COMPRESSOR, ELECTRIC SEALED COMPRESSOR APPARATUS, AND HOME APPLIANCE COMPRISING CONTROL DEVICE AND ELECTRIC SEALED COMPRESSOR APPARATUS

TECHNICAL FIELD

The present invention relates to a control device of an electric sealed compressor which has a self-protection function, an electric sealed compressor apparatus, and a home appliance comprising the control device and the electric sealed compressor apparatus.

BACKGROUND ART

Conventionally, a control device for controlling an electric motor of a compressor incorporates a power device such as IGBT and IPM (intelligent power module) having a self-protection function (e.g., see Patent Literature 1).

In a control device of an electric sealed compressor, an AC/DC converter converts an AC voltage into a DC voltage, a capacitor smooths the DC voltage and supplies the smoothed DC voltage to the IPM, and the IPM activates the electric motor of the sealed compressor.

The IPM includes a power module constituted by, for example, IGBT, an overcurrent detection circuit which is a self-protection function, an overheat detection circuit which is a self-protection function, and a control voltage abnormality detection circuit which is a self-protection function, and controls the power module in response to a control signal from, for example, a controller such as a microcontroller.

The IPM is configured such that the overcurrent detection circuit detects overcurrent, the overheat detection circuit detects overheat, and the control voltage abnormality detection circuit detects a voltage supplied to the IPM, which is outside an operational range. Upon detection of the abnormality, the IPM turns OFF the power module by the self-protection function to protect an internal device, and outputs an abnormality detection signal (Fo signal) to shut-off the operation of the power module from outside. Upon detection of the Fo signal, the microcontroller stops outputting all control signals to stop the operation of the IPM. In the above described manner, the IPM performs the self-protection operation to prevent heat generation and incorrect operation of the IPM and the electric motor of the compressor due to the overcurrent, the overheat, and the control voltage abnormality.

CITATION LIST

Patent Literature

Patent Literature 1: Japanese Laid-Open Patent Application Publication No. 2000-224861

SUMMARY OF INVENTION

Technical Problem

In the prior art, in a case where the microcontroller cannot detect the Fo signal due to some abnormality of software or some abnormality in the circuit(s), the control signal from the microcontroller is not turned OFF and the self-protection function of the IPM does not work. This may cause the heat generation and incorrect operation of the IPM and the electric motor.

The present invention is directed to solving the above described problems, and an object of the present invention is to reliably protect the control device of the electric sealed compressor from abnormality, and thereby prevent heat generation and incorrect operation of the electric motor of the electric sealed compressor.

Solution to Problem

To solve the above described problem, according to the present invention, there is provided a control device of an electric sealed compressor comprising: a power converter which activates an electric motor of the electric sealed compressor; a driving circuit which drives the power converter; an abnormality detection element which detects abnormality in an abnormality detection region including the power converter and the driving circuit; a controller configured to output a control signal for driving the power converter to the driving circuit and stop outputting the control signal in response to a signal output from the abnormality detection element, the signal indicating that the abnormality has been detected; and an auxiliary protection circuit configured to deactivate the driving circuit in response to the signal output from the abnormality detection element, the signal indicating that the abnormality has been detected.

In accordance with this configuration, even when the abnormality occurs in the controller and thereby the controller fails to perform the self-protection function in a state in which the signal output from the abnormality detection element indicates that the abnormality has been detected, the auxiliary protection circuit can deactivate the driving circuit, in response to an event that the signal output from the abnormality detection element indicates that the abnormality has been detected. As a result, the control device can be protected reliably from the abnormality, and thereby heat generation or incorrect operation of the electric sealed compressor can be prevented.

Advantageous Effects of Invention

In the present invention, the control device of the electric sealed compressor can be protected reliably from the abnormality, and thereby heat generation or incorrect operation of the electric sealed compressor can be prevented.

The above object, further object, features and advantages of the present invention will be apparent from the detailed description of the preferred embodiment, with reference to the accompanying drawings.

DESCRIPTION OF EMBODIMENTS

Figure 1:
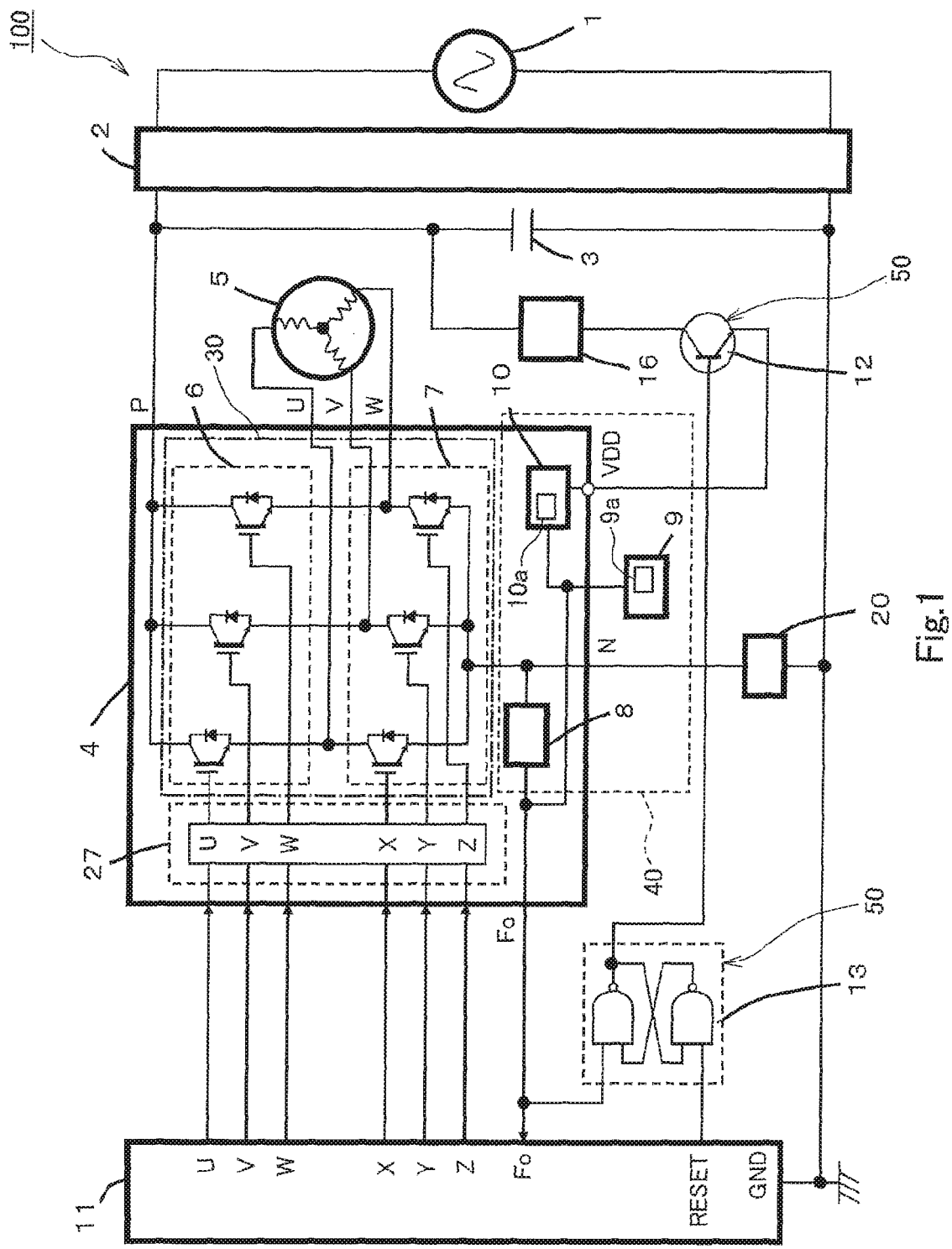
FIG. 1 is a circuit diagram showing the configuration of a control device of an electric sealed compressor according to Embodiment 1 of the present invention.

According to a first aspect of the present invention, there is provided a control device of an electric sealed compressor comprising: a power converter which supplies electric power to an electric motor of the electric sealed compressor; a driving circuit which drives the power converter; an abnormality detection element which detects abnormality in an abnormality detection region including the power converter and the driving circuit; a controller configured to output a control signal for driving the power converter to the driving circuit and stop outputting the control signal in response to a signal output from the abnormality detection element, the signal indicating that the abnormality has been detected; and an auxiliary protection circuit configured to deactivate the driving circuit in response to the signal output from the abnormality detection element, the signal indicating that the abnormality has been detected.

In accordance with this configuration, even when the abnormality occurs in the controller and thereby the controller fails to perform the self-protection function in a state in which the signal output from the abnormality detection element indicates that the abnormality has been detected, the auxiliary protection circuit can deactivate the driving circuit, in response to an event that the signal output from the abnormality detection element indicates that the abnormality has been detected. As a result, the control device can be protected reliably from the abnormality, and thereby heat generation or incorrect operation of the electric sealed compressor can be prevented.

In the control device of the electric sealed compressor according to the second aspect, the auxiliary protection circuit may include a signal holding circuit which outputs an operation signal which is a binary signal with a first level or a second level; and an emergency shut-down circuit which receives the operation signal as an input; the signal holding circuit may be configured to output the operation signal with the second level when the control device of the electric sealed compressor is started-up, to output the operation signal with the first level when the signal holding circuit receives the signal output from the abnormality detection element, the signal indicating that the abnormality has been detected, and to continue to output the operation signal with the first level after a state is formed, in which the signal output from the abnormality detection element does not indicate that the abnormality has been detected; and the emergency shut-down circuit may be configured to deactivate the driving circuit when the operation signal is the first level and to activate the driving circuit when the operation signal is the second level. The phrase "the signal holding circuit receives the signal output from the abnormality detection element, the signal indicating that the abnormality has been detected" means that the signal holding circuit receives the signal directly or indirectly. A case where the signal holding circuit receives the signal indirectly includes, for example, a case where the signal output from the abnormality detection element, the signal indicating that the abnormality has been detected, is amplified by an amplifier, and the amplified signal is received by the signal holding circuit, and a case where the signal output from the abnormality detection element is converted into a binary signal with one of two levels, corresponding to whether or not the abnormality has been detected, and the binary signal indicating that the abnormality has been detected is received by the signal holding circuit.

Regarding the abnormality in the abnormality detention region, its abnormal state does not continue all the time, but may return to a normal state soon, or the abnormal state and the normal state occur repeatedly. In accordance with the above described configuration, when the signal holding circuit receives the signal indicating that the abnormality has been detected, from the abnormality detection element, it outputs the operation signal with the first level and continues to output the operation signal with the first level even after the signal received from the abnormality detection element does not indicate that the abnormality has been detected, any more. Therefore, the deactivated state (stopped state) of the driving circuit is continued for a specified time period, irrespective of whether or not the abnormal state continues. This makes it possible to prevent a situation in which the driving circuit is frequently deactivated (stopped) and activated repeatedly.

According to a third aspect of the present invention, the control device of the electric sealed compressor may further comprise an abnormality detector which converts the signal output from the abnormality detection element into an abnormality detection signal which is a binary signal with one of two levels corresponding to whether or not the abnormality has been detected and outputs the abnormality detection signal to the controller; and the controller may be configured to stop outputting the control signal in response to the abnormality detection signal received from the abnormality detector, when the abnormality detection signal has the level indicating that the abnormality has been detected.

In this configuration, the signal output from the abnormality detection element is converted into the abnormality detection signal which is the binary signal. Therefore, the controller can easily determine the presence/absence of the abnormality, and reliably execute the output stop process of the control signal by the self-protection function.

According to a fourth aspect of the present invention, the control device of the electric sealed compressor may further comprise an amplifier which amplifies the signal output from the abnormality detection element; and the auxiliary protection circuit may be configured to deactivate the driving circuit when a level of a signal output from the amplifier falls within a predetermined level range indicating that the abnormality detection element has detected the abnormality.

In this configuration, since the auxiliary protection circuit deactivates the driving circuit in response to the signal output from the amplifier for amplifying the signal output from the abnormality detection element, the input circuit from the abnormality detection element to the auxiliary protection circuit can be simplified.

According to a fifth aspect of the present invention, in the control device of the electric sealed compressor, the abnormality detector may be configured to output the abnormality detection signal to the auxiliary protection circuit; and the auxiliary protection circuit may be configured to deactivate the driving circuit in response to the abnormality detection signal received from the abnormality detector, when the abnormality detection signal has the level indicating that the abnormality has been detected.

In this configuration, the signal output from the abnormality detection element is converted into the abnormality detection signal which is the binary signal. Therefore, the auxiliary protection circuit can easily determine the presence/absence of the abnormality, and reliably execute the output stop process of the control signal by the auxiliary protection function.

According to a sixth aspect of the present invention, in the control device of the electric sealed compressor, the emergency shut-down circuit may be configured to set a power supply voltage of the driving circuit to a voltage which is equal to or lower than a specified voltage at which the driving circuit is deactivated due to voltage insufficiency when the operation signal is the first level and to set the power supply voltage of the driving circuit to a voltage which is higher than the specified voltage when the operation signal is the second level.

In this configuration, by decreasing the power supply voltage of the driving circuit to a voltage which is equal to or lower than the voltage at which the driving circuit is deactivated due to voltage insufficiency, the driving circuit can be deactivated. If the power supply voltage of the driving circuit is decreased to 0V, it becomes difficult to quickly increase the power supply voltage applied to the driving circuit thereafter, due to a parasitic capacitance or the like of the driving circuit or the like. Therefore, in this configuration, the voltage applied to the driving circuit in the restoration (re-start) of the control device can be made higher more quickly and hence the control device can be restored more quickly, than in a case where the power supply voltage of the driving circuit is decreased to 0V.

According to a seventh aspect of the present invention, in the control device of the electric sealed compressor, the emergency shut-down circuit may be configured to disconnect the driving circuit from a power supply when the operation signal is the first level and to connect the driving circuit to the power supply when the operation signal is the second level.

In this configuration, when the operation signal is the first level, the power supply voltage is not supplied to the driving circuit. Therefore, the power converter can be reliably deactivated.

According to an eighth aspect of the present invention, in the control device of the electric sealed compressor, the emergency shut-down circuit may be configured to disconnect a path through which the control signal is supplied to the driving circuit when the operation signal is the first level and to establish the path when the operation signal is the second level.

In this configuration, since the supply path of the control signal is controlled, the operation of the driving circuit can be directly stopped.

According to a ninth aspect of the present invention, in the control device of the electric sealed compressor, the signal holding circuit may be configured to automatically output the operation signal with the second level when a predetermined time passes after the signal holding circuit outputs the operation signal with the first level.

In this configuration, the processing for restoring the control device can be omitted.

According to a tenth aspect of the present invention, in the control device of the electric sealed compressor, the signal holding circuit may be configured to output the operation signal with the second level in response to a reset signal input to the signal holding circuit, after the signal holding circuit outputs the operation signal with the first level.

In this configuration, after it is confirmed that the abnormality has bee resolved, the control device can be restored manually.

According to an eleventh aspect of the present invention, in the control device of the electric sealed compressor, the signal holding circuit may include a monostable multivibrator circuit which is configured to operate in response to as a trigger the signal received from the abnormality detection element, indicating that the abnormality has been detected, and is configured such that a signal output in a stable state corresponds to the second level of the operation signal and a signal output in an unstable state corresponds to the first level of the operation signal.

In this configuration, by hardware, the control device can be automatically restored.

According to a twelfth aspect of the present invention, in the control device of the electric sealed compressor, the signal holding circuit may include a timer circuit configured to operate for a set time in response to as a trigger the signal received from the abnormality detection element, indicating that the abnormality has been detected, and may be configured such that a signal in a non-operating state corresponds to the second level of the operation signal and a signal in an operating state corresponds to the first level of the operation signal.

In this configuration, by hardware, the control device can be automatically restored.

According to a thirteenth aspect of the present invention, in the control device of the electric sealed compressor, the signal holding circuit may include a flip flop circuit configured such that the signal output from the abnormality detection element is input to a set terminal, the reset signal is input to a reset terminal, a signal output in response to the reset signal corresponds to the second level of the operation signal, and a signal output in response to the signal received from the abnormality detection element, indicating that the abnormality has been detected, corresponds to the first level of the operation signal.

In this configuration, by hardware, the control device can be restored by manual reset operation.

According to a fourteenth aspect of the present invention, in the control device of the electric sealed compressor, the abnormality detection element may be a current detection element which detects an input current or an output current of the power converter, and the signal output from the abnormality detection element, indicating that the abnormality has been detected, indicates that the input current or the output current is an overcurrent which is equal to or higher than a predetermined current value. The current detection element may be provided, for example, inside or outside, IPM.

In this configuration, the auxiliary protection circuit can protect the control device against a typical overcurrent as the abnormality in the abnormality detection region including the power converter and the driving circuit.

According to a fifteenth aspect of the present invention, there is provided an electric sealed compressor apparatus comprising: the control device of the electric sealed compressor as recited in any one of first to fourteenth aspects; and the electric sealed compressor. In a conventional example, to detect abnormal heat generation of windings due to the overcurrent of the electric sealed compressor, an element which is capable of disconnecting the power supply, depending on the temperature, such as thermostat or bimetal is mounted in the vicinity of the electric sealed compressor. In the above configuration, the operation (running) due to the overcurrent can be reliably stopped. Therefore, even when the protective element such as the thermostat or bimetal is not used, the abnormal heat generation of windings due to the overcurrent of the electric sealed compressor can be prevented.

According to a sixteenth aspect of the present invention, there is provided a home appliance comprising the electric sealed compressor as recited in the fifteenth aspect. The home appliance may be, for example, a freezer, a refrigerator, an air conditioner, a vending machine, etc.

A control device of an electric sealed compressor of the present embodiment includes a printed board on which elements constituting a circuit for activating and controlling the electric motor of the electric sealed compressor and a reactor constituting an input section to the power converter, are mounted on a main surface thereof, a container which is mounted to the electric sealed compressor, accommodates the printed board, and has an opening, and a lid mounted to close the opening, and the tip end portion of the reactor may be supported on the lid directly or via a member.

In this configuration, since the tip end portion of the reactor is supported by the lid, the vibration of the reactor can be suppressed as compared to a case where only the base end portion of the reactor is fastened to the printed board. In addition, by changing the state in which the tip end portion of the reactor is supported by the lid, the resonant frequency of the reactor can be adjusted. This allows the resonant frequency of the reactor to fall outside the use frequency of the compressor. As a result, even when the vibration is transmitted from the electric sealed compressor, damages to the joint portions between the reactor and the board can be prevented.

The above stated member may be a spacer retained between the tip end of the reactor and the lid.

The tip end portion of the reactor has anisotropy in the thickness direction of the printed board. The surface of the spacer which is closer to the reactor may be provided with two or more convex portions such that the convex portions surround the anisotropic tip end portion of the reactor and are in contact with the side surfaces of the tip end portion of the reactor.

In this configuration, when the spacer is going to be rotated around the axis extending in the thickness direction of the printed board, the two or more convex portions of the spacer contact the anisotropic portion of the reactor and the rotation of the spacer is inhibited. In this way, the rotation of the spacer can be prevented.

The spacer may be formed of the same resin as that of the bobbin of the reactor. It is sufficient that the resin has an insulativity. For example, the resin may be polyethylene terephthalate (PET).

In this configuration, since the bobbin of the reactor and the spacer are equal in expansion coefficient, a strain between these members due to a vibration can be lessened. Therefore, the spacer is less likely to be disengaged from the reactor, which improves reliability.

The control device of the electric sealed compressor may be configured such that a protrusion is provided on the reverse side of the lid, and the tip end portion of the reactor is directly supported on the protrusion.

Hereinafter, the control device of the electric sealed compressor of the embodiment of the present invention will be described with reference to the drawings. Hereinafter, throughout the drawings, the same or corresponding components are designated by the same reference numbers, and will not be described repeatedly.

Embodiment 1

[Configuration]
FIG. 1 is a circuit diagram showing the configuration of a control device 100 of an electric sealed compressor according to Embodiment 1 of the present invention.

As shown in FIG. 1, the control device 100 of the electric sealed compressor includes an AC/DC converter section 2 connected to an AC power supply 1, a capacitor 3, an IPM (intelligent power module) 4 having a self-protection function, an IPM control power supply 16, an abnormality detector 40, a controller 11, and an auxiliary (backup) protection circuit 50.

The AC/DC converter section 2 is configured to convert AC power input from the AC power supply 1 into DC power and outputs the DC power. In FIG. 1, reference symbol P and reference symbol N indicate a high-potential wire and a low-potential wire of the DC power, respectively. The capacitor 3 smooths the voltage of the DC power output from the AC/DC converter section 2.

The IPM control power supply 16 decreases the voltage of the DC power output from the AC/DC converter section 2 to a specified voltage, and supplies this voltage to a positive power supply terminal VDD of the IPM via an emergency shut-down circuit 12, as will be described later. The voltage of the positive power supply terminal VDD is supplied as a power supply voltage to particular elements including a driving circuit 27 and the abnormality detector 40 within the IPM4. The voltage output from the IPM control power supply 16 is supplied as a power supply voltage to the controller 11 via the emergency shut-down circuit 12.

In the present embodiment, the IPM 4 includes a power converter 30, the driving circuit 27 for driving the power converter 30, and a part of the abnormality detector 40.

Figure 8:
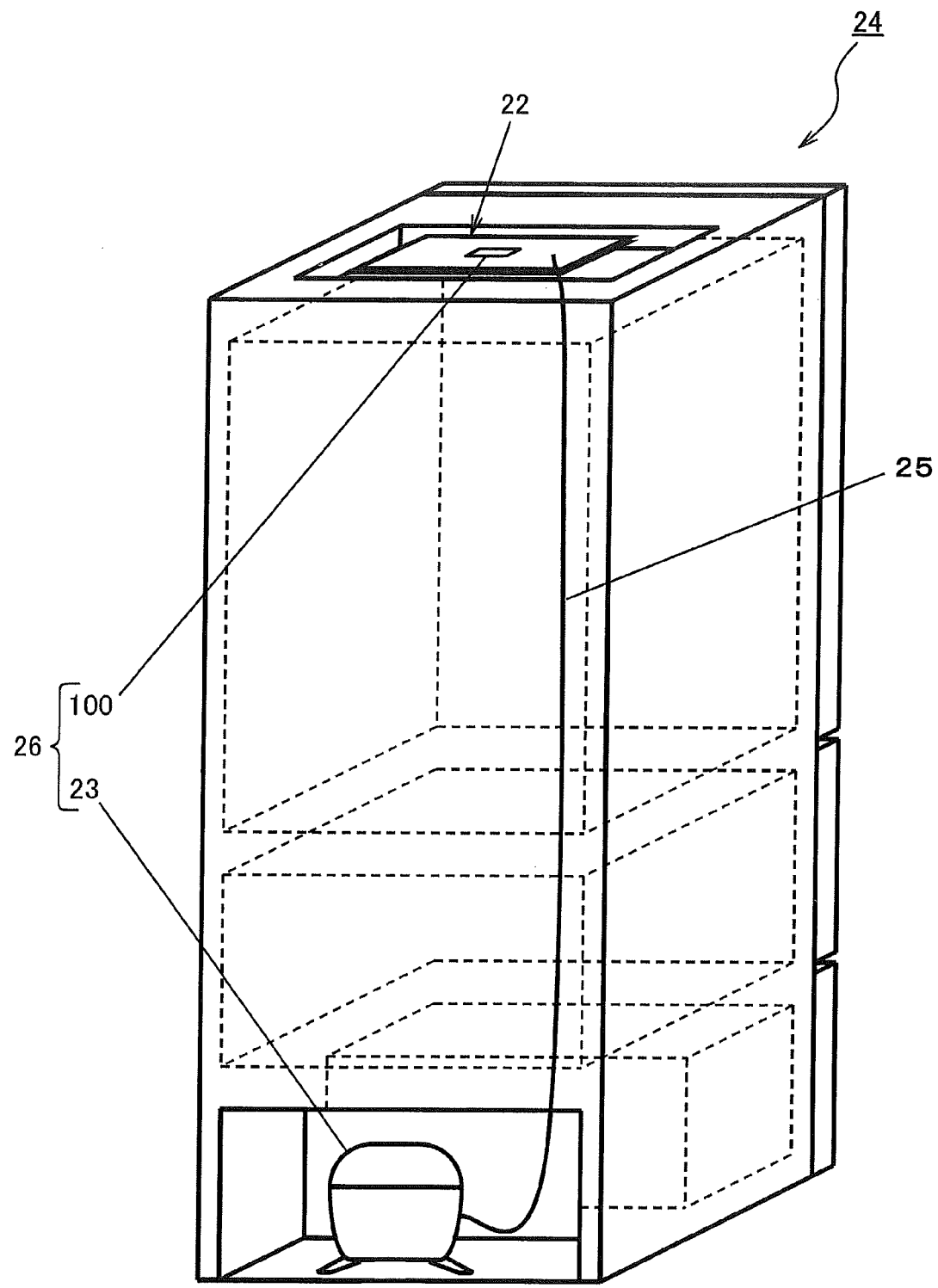
FIG. 8 is a view showing the configuration of a refrigerator including an electric sealed compressor according to Embodiment 6 of the present invention.

The power converter 30 supplies electric power to an electric motor 5 of an electric sealed compressor (designated by reference symbol 23 in FIG. 8). In the present embodiment, the power converter 30 is constituted by an inverter which includes as the power modules, three IGBTs constituting an upper arm 6 and three IGBTs constituting a lower arm 7. The power modules operate to supply the electric power to the electric motor 5 of the electric sealed compressor. Reference symbols U, V, and W in FIG. 1 indicate the phases of three-phase AC power supplied from the power modules to the electric motor 5. The power modules supply to the electric motor 5 the electric power controlled by the controller 11, via the driving circuit 27. From this, it may be said that the power modules activate the electric motor 5. The power converter 30 may be constituted by a power module which is other than the IGBTs. For example, the power module may be a bipolar transistor, or a MOSFET. The number of phases of the electric motor 5 and the number of phases of the power modules may be set as desired.

The driving circuit 27 activates (drives) the power converter 30. In the present embodiment, the driving circuit 27 activates the power converter 30 in accordance with the control signal of the controller 11. The control signal of the controller 11 is, for example, a PWM signal. The driving circuit 27 amplifies the PWM signal to a level at which the power converter 30 can be activated, and outputs the amplified signal.

The abnormality detector 40 detects abnormality in an abnormality detection region for which any abnormality is to be detected, including the power converter 30 and the driving circuit 27. The abnormality detection region may include the power converter 30, the driving circuit 27, and other desired elements. In the present embodiment, the abnormality detection region is, for example, IPM4. The abnormality detector 40 includes an overcurrent detection circuit 8 for detecting overcurrent, an overheat detection circuit 9 for detecting overheat within the power module, a control voltage abnormality detection circuit 10 for detecting whether or not the voltage supplied to the positive power supply terminal VDD of the IPM4 falls within an operation range (allowable range), and others.

The overcurrent detection circuit 8 detects an overcurrent of the power converter 30 based on the current value detected by a current detection element 20 outside the IPM4. The current detection element 20 detects a current input to or output from the power converter 30. The overcurrent detection circuit 8 generates a binary signal with one of two levels, corresponding to whether or not the detected input current or output current is equal to or greater than a predetermined current value, and outputs the binary signal, thus detecting the overcurrent of the power converter 30. Although in the example of FIG. 1, the current detection element 20 detects the current input to the power converter 30, it may detect the current output from the power converter 30. The current detection element 20 may include, for example, CT (current transformer), a resistive element inserted into a path of the current input to or output from the power converter 30, etc. In the present embodiment, the current detection element 20 is constituted by a resistive element. The overcurrent detection circuit 8 detects the voltage at both ends of this resistive element, thereby detecting the current of the power converter 30 (in this example, input current).

The overheat detection circuit 9 generates a binary signal with one of two levels corresponding to whether or not the temperature of the controller 100 is equal to or higher than a predetermined temperature, based on the value of the temperature of the control device 100, which is detected by a temperature detection element 9a, thus detecting the overheat state of the control device 100.

The voltage abnormality detection circuit 10 detects the voltage supplied to the positive power supply terminal VDD of the IPM 4, by using the voltage detection element 10a, and generates a binary signal with one of two levels, corresponding to whether or not the detected voltage is equal to or higher than a predetermined voltage. In this way, the voltage abnormality detection circuit 10 detects whether or not the voltage supplied to the positive power supply terminal VDD of the IPM 4 is outside the operation range.

When any of the overcurrent detection circuit 8, the overheat detection circuit 9, and the voltage abnormality detection circuit 10 detects abnormality, the abnormality detector 40 outputs to the controller 11 an abnormality detection signal (hereinafter will also be referred to as Fo signal) to shut-off the operation of the power converter circuit 20. Specifically, for example, the abnormality detector 40 outputs as the abnormality detection signal the binary signal output from the overcurrent detection circuit 8, the overheat detection circuit 9, or the voltage abnormality detection circuit 10.

The controller 11 is configured to output to the driving circuit 27 the control signal for driving the power converter 30, and stop the output of the control signal based on the signal indicating that the abnormality has been detected, from the abnormality detector 40. In the present embodiment, the controller 11 is, for example, a microcontroller electrically connected to the IPM4, which supplies the control signal to desired elements of the IPM 4 including the driving circuit 27. Note that the controller 11 may control only the driving circuit 27, and other controllers may control other elements.

The auxiliary protection circuit 50 is configured to deactivate (stop the operation of) the driving circuit 27 in response to the signal (Fo signal) from the abnormality detector 40, indicating that the abnormality has been detected. The auxiliary protection circuit 50 includes a signal holding circuit 13 which outputs an operation signal which is a binary signal with a first level or a second level, and the emergency shut-down circuit 12 which receives the operation signal.

The signal holding circuit 13 is configured to output the operation signal with the second level (e.g., High level), when the control device 100 of the electric sealed compressor is started-up, to output the operation signal with the first level (e.g., Low level) when the signal holding circuit 13 receives the signal from the abnormality detector 40, indicating that the abnormality has been detected, and to continue to output the operation signal with the first level, even after the signal received from the abnormality detector 40 does not indicate that the abnormality has been detected, any more. Specifically, in the present embodiment, the signal holding circuit 13 is configured as a flip flop circuit in which the Fo signal is input to a set terminal, a reset signal is input to a reset terminal, and the signal output in the case where the reset signal is input corresponds to the second level of the operation signal, and the signal output in the case where the Fo signal with the level indicating that the abnormality has been detected corresponds to the first level of the operation signal. Although in the example of FIG. 1, the flip flop circuit is configured to include a NAND circuit, it may be configured to include a logic circuit (e.g., OR circuit) which is equivalent to the NAND circuit.

The Fo signal output from the IPM4 is input to the controller 11 and to the flip flop circuit 13. The reset signal is output from the controller 11 to the flip flop circuit 13.

The emergency shut-down circuit 12 is configured to deactivate (stop the operation of) the driving circuit 27 when the operation signal is the first level, and to activate (enables the driving circuit 27 to operate) the driving circuit 27 when the operation signal is the second level. The emergency shut-down circuit 12 may be configured as, for example, a switching element. As the switching element, a bipolar transistor, a MOS transistor, etc., are illustrated. In the present embodiment, the emergency shut-down circuit 12 is a npn bipolar transistor (hereinafter will be simply referred to as transistor) placed between the output terminal of the IPM control power supply 16 of the driving circuit 27 and the positive power supply terminal VDD of the IPM 4. This transistor is configured to be turned OFF to disconnect the driving circuit 27 from the IPM control power supply 16 when the operation signal output from the signal holding circuit 13 is the first level, and to be turned ON to connect the driving circuit 27 to the IPM control power supply 16 when the operation signal output from the signal holding circuit 13 is the second level.

[Operation]

Next, the operation of the control device 100 of the electric sealed compressor configured as described above will be described.

First of all, a basic operation will be described. The AC/DC converter section 2 converts the AC voltage supplied from the AC power supply 1 into the DC voltage. The capacitor 3 smooths the DC voltage. The smoothed DC voltage is supplied at an unchanged voltage (e.g., 310V) to the power modules of the power converter 30 built into the IPM 4. Also, the IPM control power supply 16 decreases the smoothed DC voltage to a specified voltage (e.g., 15V) and supplies as the power supply voltage to the positive power supply terminal VDD of the IPM 4 via the transistor (hereinafter will be referred to as transistor 12) as the emergency shut-down circuit 12.

In response to the control signal output from the controller 11, the IPM 4 turns ON the IGBT6 and the IGBT7 of the power converter 30 at, for example, Active High via the driving circuit 27, and turns OFF the IGBT6 and the IGBT7 of the power converter 30 at, for example, Active Low via the driving circuit 27. By the basic operation, the AC power controlled by the controller 11 is output from the power converter 30 and supplied to the electric motor 5 of the electric sealed compressor. In this way, the controller 11 performs inverter-control of the electric sealed compressor.

Next, the abnormality detection control performed by the control device 100 of the electric sealed compressor, will be described. When the abnormality detector 40 detects abnormality which is any one of overcurrent detected by the overcurrent detection circuit 8, overheat within the power modules which is detected by the overheat detection circuit 9, and an event that the voltage supplied the IPM4 falls outside the operation range, which is detected by the voltage abnormality detection circuit 10, the IPM 4 turns OFF the IGBT6 or the IGBT7, to protect the internal device. Furthermore, the IPM 4 causes the abnormality detector 40 to output the abnormality detection signal (Fo signal) to the controller 11 and the signal holding circuit (flip flop circuit) 13. Now, this will be described specifically.

Upon detection of the abnormality detection signal (Fo signal), the controller 11 immediately stops outputting of the control signal to the IPM 4 (driving circuit 27 and the other elements), thereby stopping the operation of the IPM4. This is the self-protection function.

However, in some occasions, due to abnormality in software, or abnormality in the circuit(s), the controller 11 may fail to perform a self-protection operation. Specifically, the controller 11 fails to detect the Fo signal or fails to stop the control signal. However, in the present embodiment, even in such a case, the auxiliary protection circuit 50 deactivates the driving circuit 27 in response to the abnormality detection signal to stop the operation of the IPM 4 as an auxiliary protection function.

Specifically, when the control device 100 is started-up, the flip flop circuit (hereinafter will be referred to as flip flop circuit 13) as the signal holding circuit 13 outputs the operation signal with the second level. In response to the operation signal, the transistor as the emergency shut-down circuit 12 is turned ON, the IPM control power supply 16 is connected to the driving circuit 27, and the driving circuit 27 operates so as to activate the power converter 30. When the Fo signal with the level indicating that any one of the overcurrent detection circuit 8, the overheat detection circuit 9, and the voltage abnormality detection circuit 10, has detected the abnormality, is input to the flip flop circuit 13, the flip flop circuit 13 outputs the operation signal with the first level, and holds the first level until the reset signal is input. This causes the transistor as the emergency shut-down circuit 12 to be turned OFF, and the driving circuit 27 to be disconnected from the IPM control power supply 16. In this way, the operation of the power converter 30 is stopped.

In addition to the above, supplying of the voltage to the IPM 4 is forcibly stopped. Since the operation of the IPM 4 can be stopped, the controller 11 is placed in an abnormal state. In this state, even when the control signal continues to be input to the elements which are other than the driving circuit 27, the IPM 4 can be deactivated (operation of the IPM4 is stopped) safely, and thereby heat generation or incorrect operation of the IPM 4 and the electric motor 5 can be prevented.

When the reset signal from a restoration operation circuit (not shown) included in the controller 11 is input to the flip flop circuit 13, to terminate the protection operation of the IPM 4, the flip flop circuit 13 outputs the operation signal with the second level, thereby causing the transistor 12 to be turned ON again. Thus, supplying of the electric power to the IPM 4 is resumed, and the control device 100 shifts (is restored) to a normal state. As described above, since the auxiliary protection circuit 50 includes the flip flop circuit as the signal holding circuit 13, and the controller 11 includes the restoration operation circuit which is manually operated, the control device 100 can be restored by the manual operation, after it is confirmed that the abnormality has been resolved.

As described above, in accordance with the present embodiment, even when the abnormality occurs in the controller 11 and thereby the controller 11 fails to perform the self-protection function in a state in which the signal output from the abnormality detector 40 indicates that the abnormality has been detected, the auxiliary protection circuit 50 deactivates the driving circuit 27 (stops the operation of the driving circuit 27), when the signal output from the abnormality detector 40 indicates that the abnormality has been detected. As a result, the control device 100 can be protected reliably from the reliability, and thereby heat generation or incorrect operation of the IPM 4 and the electric motor 5 can be prevented.

Especially, in the case of the abnormality detection region including the power converter 30 and the driving circuit 27, its absolute state does not continue all the time, but may return to a normal state early, or the abnormal state and the normal state occur repeatedly. In accordance with the above described configuration, when the signal holding circuit 13 receives the signal indicating that the abnormality has been detected, from the abnormality detector 40, it outputs the operation signal with the first level and continues to output the operation signal with the first level even in the state in which the signal received from the abnormality detector 40 does not indicate that the abnormality has been detected, any more. Therefore, the deactivated state (stopped state) of the driving circuit 27 is continued for a specified time period (in this example, until the reset signal is input), irrespective of whether or not the abnormal state continues. This makes it possible to prevent a situation in which the driving circuit 27 is frequently deactivated (stopped) and activated repeatedly.

Embodiment 2

Figure 2:
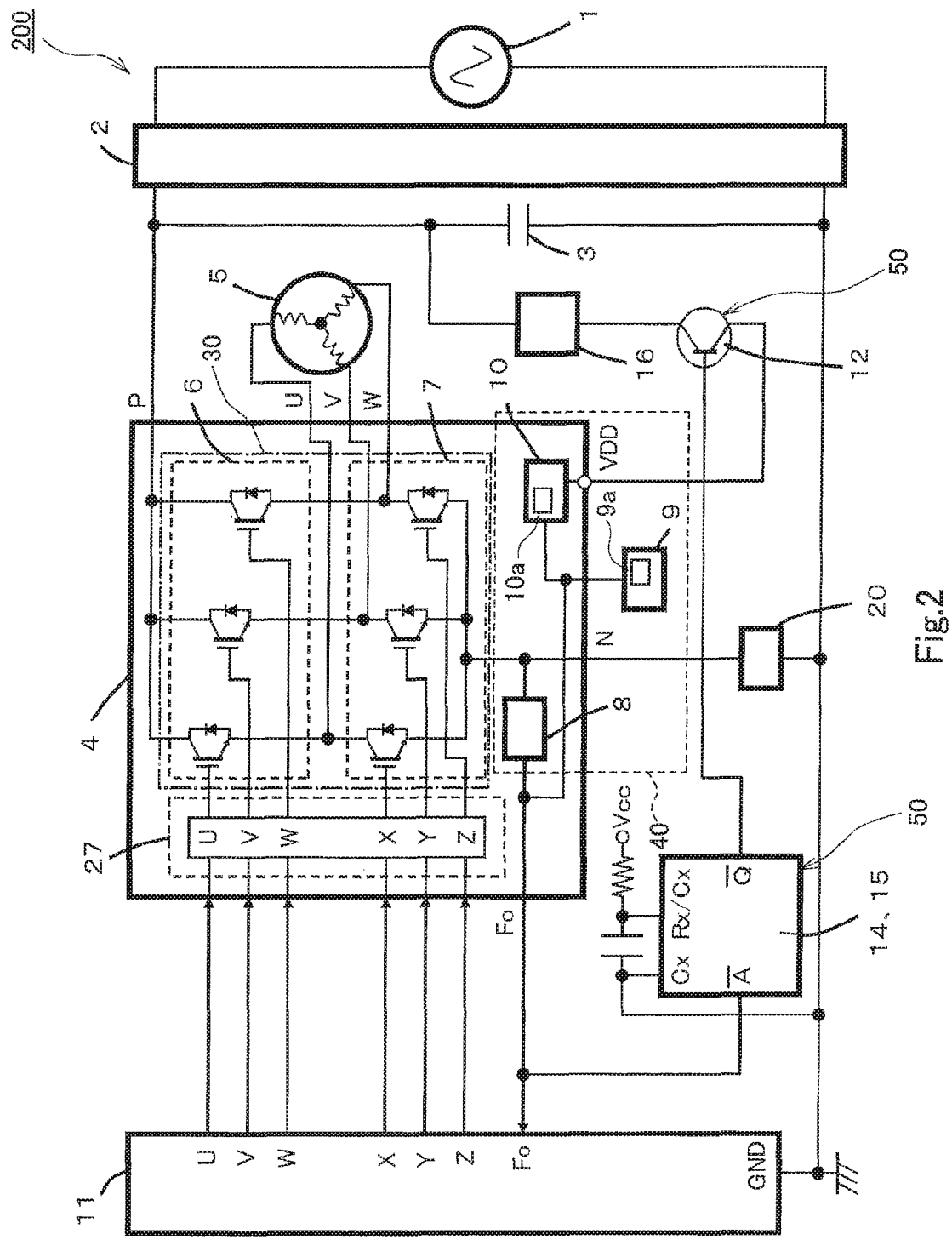
FIG. 2 is a circuit diagram showing the configuration of a control device of an electric sealed compressor according to Embodiment 2 of the present invention.

FIG. 2 is a circuit diagram showing the configuration of a control device of an electric sealed compressor according to Embodiment 2 of the present invention.

In the present embodiment, the same components as those of Embodiment 1 will not be described repeatedly, and only the differences from the configuration of Embodiment 1 will be described.

As shown in FIG. 2, the control device 200 of the electric sealed compressor of the present embodiment is different from the control device of Embodiment 1 in that the control device 200 includes a monostable multivibrator circuit 14 or a timer circuit 15, as the signal holding circuit of the auxiliary protection circuit 50, instead of the flip flop circuit 13. Since the monostable multivibrator circuit and the timer circuit are well-known, specific configurations thereof will not be described.

The signal holding circuit 14, 15 includes a resistor and capacitor which are attached externally. The resistor and the capacitor are connected in series between a positive power supply terminal VCC and a ground. The signal holding circuit 14, 15 detects the edge of the Fo signal input thereto, by using a time constant of the resistor and the capacitor, and generates a square wave pulse signal for a specified time period (duration). The signal level of the square wave pulse signal in a period when a square wave pulse does not exist corresponds to the second level of the operation signal, while the signal level of the square wave pulse signal in a period when the square wave pulse exists corresponds to the first level of the operation signal. When the control device 100 of the electric sealed compressor is started-up, the signal holding circuit 14, 15 of the present embodiment outputs the operation signal with the second level, while when the signal holding circuit 14, 15 receives the Fo signal with the level indicating that the abnormality has been detected, from the abnormality detector 40, it outputs the operation signal with the first level, and continues to output for a specified period the operation signal with the first level even after the level of the Fo signal does not indicate that the abnormality has been detected, any more, and then automatically outputs the operation signal with the second level.

As described above, in the present embodiment, since the reset signal sent from the controller 11 to the signal holding circuit may be omitted, simple and inexpensive circuit configuration can be attained.

Figure 3:
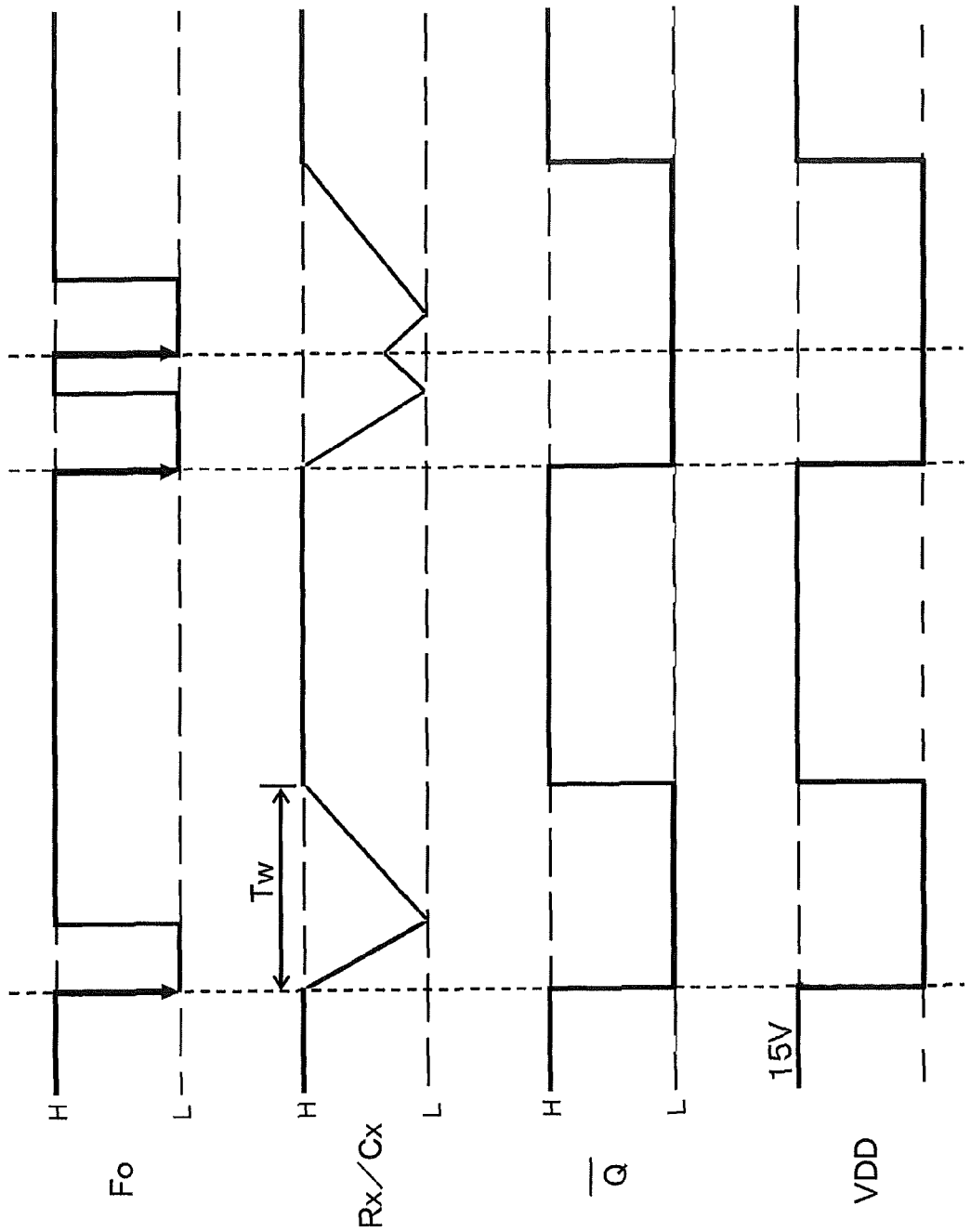
FIG. 3 is a time chart of signals of the control device of the electric sealed compressor according to Embodiment 2 of the present invention.

FIG. 3 is a time chart of the signals in the control device of the electric sealed compressor according to Embodiment 2 of the present invention. In the time chart of FIG. 3, the waveform of the Fo signal, the waveform of a timer signal (Rx/Cx) within the signal holding circuit 14, 15, the waveform of an output signal Q bar, and the waveform of a power supply voltage $V_{DD}$ supplied to the IPM, are shown in this order from the upper side. As shown in FIG. 3, the Fo signal output from the IPM 4 is High level in a state in which no abnormality is detected. In this state, the signal holding circuit 14, 15 outputs the operation signal with High level from the output Q bar. Upon detection of the abnormality, the Fo signal becomes Low level. When the signal holding circuit 14, 15 detects the falling edge of the Fo signal by input A bar, it converts the operation signal with High level which is output from the output Q bar into the operation signal with Low level by using the duration of a time constant Tw of the resistor and the capacitor attached externally, and outputs the operation signal with Low level from the output Q bar. In response to the operation signal with Low level which is output from the output Q bar, the transistor (emergency shut-down circuit) 12 is turned OFF for a period of Tw. For the period of Tw, the power supply voltage $V_{DD}$ supplied to the driving circuit 27 of the IPM 4 is 0V. This can stop the operation of the IPM 4 including the driving circuit 27 for the specified period.

In this configuration, even if the controller 11 cannot stop outputting the control signal, due to some abnormality of software or abnormality in the circuit(s), the auxiliary protection circuit 50 can protect the control device 200 from the abnormality. Besides, if the Fo signal of the IPM 4 is stopped, it becomes possible to automatically terminate disconnection of the control power supply to the IPM 4. In this way, the control device 200 can reliably shift to the normal operation.

As described above, in accordance with the present embodiment, even in the case where some abnormality occurs in the controller 11 and thereby the controller 11 fails to perform the self-protection function, in a state in which the signal output from the abnormality detector 40 indicates that the abnormality has been detected, the signal holding circuit 14, 15 forms a state in which the power supply voltage is not supplied to the driving circuit 27 for the specified period. Therefore, the power converter 30 can be deactivated safely, and thereby heat generation or incorrect operation of the IPM 4 and the electric motor 5 can be prevented.

In addition, the signal holding circuit 14, 15 can make it possible to prevent the driving circuit 27 from being frequently deactivated and activated repeatedly.

Embodiment 3

Figure 4:
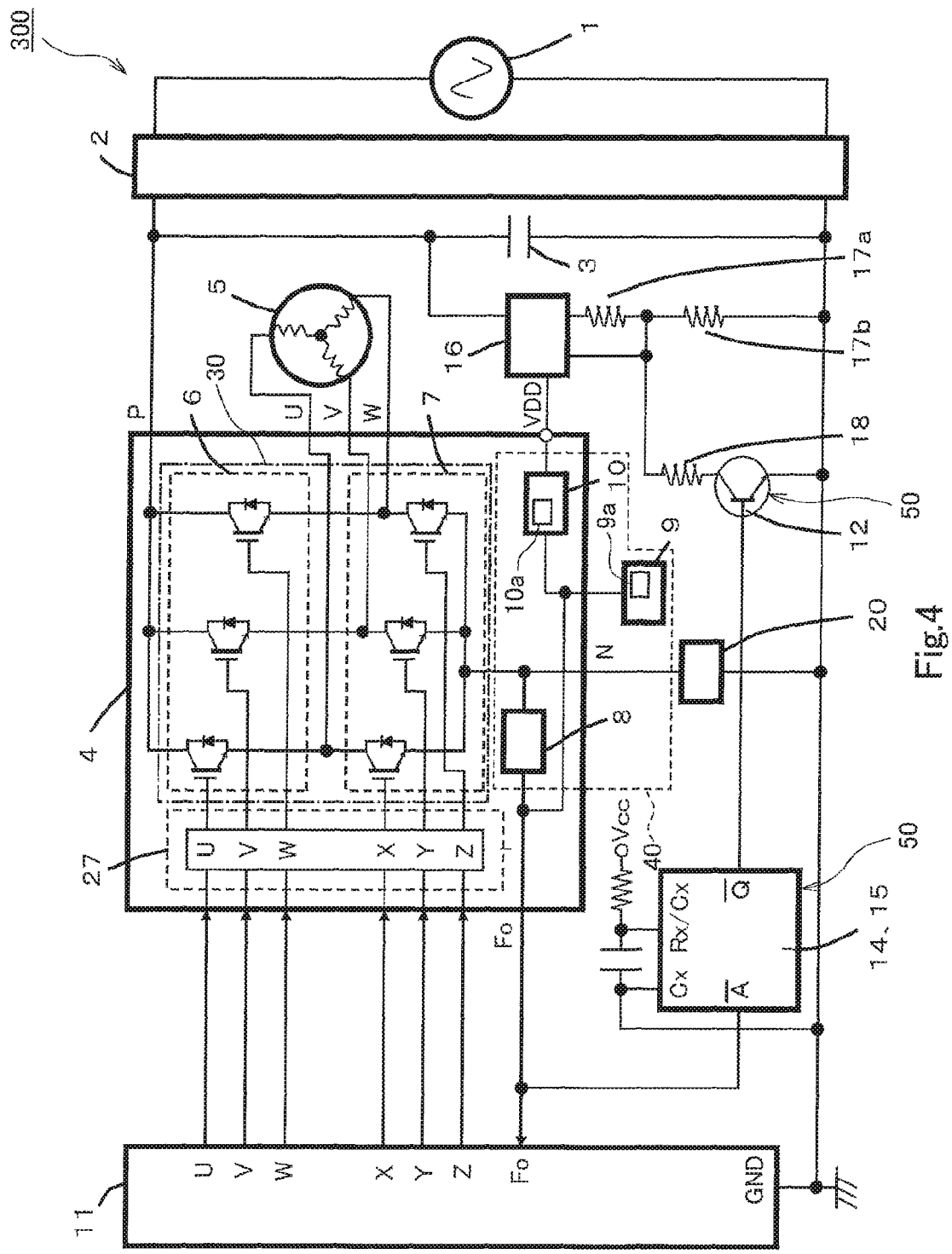
FIG. 4 is a circuit diagram showing the configuration of a control device of an electric sealed compressor according to Embodiment 3 of the present invention.
Figure 5:
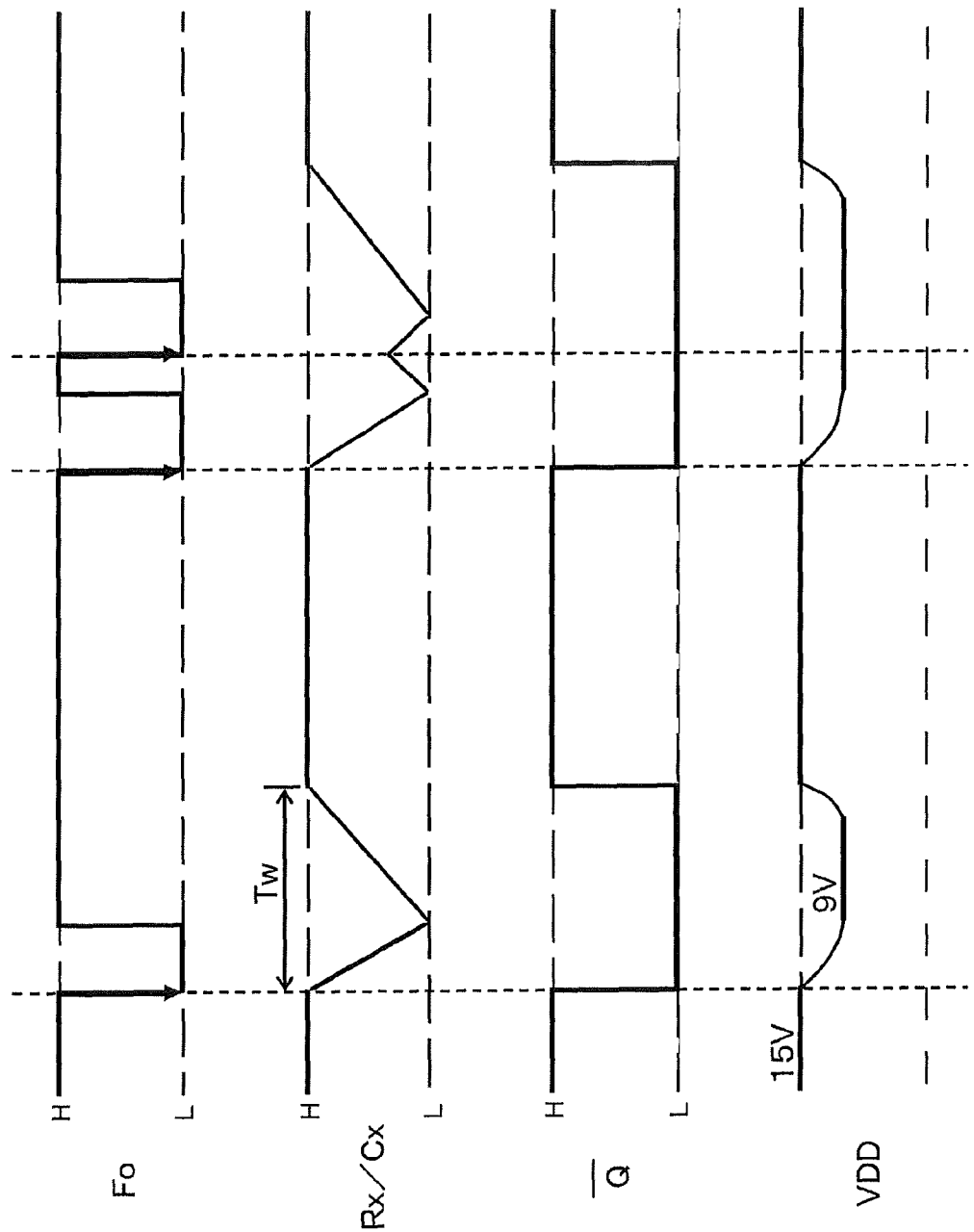
FIG. 5 is a time chart of signals of the control device of the electric sealed compressor according to Embodiment 3 of the present invention.

FIG. 4 is a circuit diagram showing the configuration of a control device of an electric sealed compressor according to Embodiment 3 of the present invention. FIG. 5 is a time chart of signals in the control device of the electric sealed compressor according to Embodiment 3 of the present invention.

As shown in FIG. 4, the control device 300 of the electric sealed compressor of the present embodiment is different from the control device of Embodiment 1 and the control device of Embodiment 2 in that the IPM control power supply 16 includes external resistors 17a and 17b which are connected in series and is capable of varying the output voltage at a voltage division of the external resistors 17a and 17b. Hereinafter, the same components as those of Embodiment 1 and Embodiment 2 will not be described repeatedly, and only the differences from the configuration of Embodiment 1 and Embodiment 2 will be described.

In the present embodiment, the IPM control power supply 16 is an IPD (intelligent power device) which supplies a power supply voltage to the positive power supply terminal VDD of the IPM4 and to the controller 11.

The collector terminal of the transistor 12 is connected to a parallel resistor 18 of the external resistor 17b of the IPM control power supply 16. In the present embodiment, the transistor 12 and the parallel resistor 18 constitute an emergency shut-down circuit. The IPM control power supply 16 is configured to output a steady operation voltage (e.g., 15V) generated by voltage division based on the ratio between the resistance value of the external resistor 17a and a composition resistance value of the external resistor 17b and the parallel resistor 18, during a normal state. On the other hand, when abnormality occurs in the IPM4 and the Fo signal of the IPM4 is input to the signal holding circuit 14, 15, the square wave pulse signal of the duration of Tw is output from the signal holding circuit 14, 15 to the transistor 12, which is thereby turned OFF. Thereby, a path on which the parallel resistor 18 is provided is disconnected, and the output voltage of the IPM control power supply 16 changes by the voltage division of the ratio between the external resistors 17a and 17b and is decreased to a voltage which is equal to or lower than a voltage (e.g., 9V) which allows the control voltage abnormality protection operation of the IPM4 to work (see FIG. 5). Thus, the operation of the IPM4 can be stopped safely.

When the operation signal is the first level, the emergency shut-down circuit (transistor 12 and parallel resistor 18) can stop the IPM4 (including driving circuit 27), by merely decreasing the output voltage (power supply voltage of the driving circuit 27, and the like) of the IPM control power supply 16 to a voltage which is equal to or lower than a specified voltage (9V). Therefore, in this configuration, the voltage applied to the IPM4 in the restoration of the control device 300 can be made higher more quickly and hence the control device 300 can be restored more quickly, than in a case where the voltage applied to the IPM4 is decreased to 0V.

Furthermore, in the present embodiment, a minute current flows through the transistor 12 and the magnitude of this current is much smaller than that of the allowable current of the transistor 12 used in Embodiment 1 and Embodiment 2. As a result, the transistor 12 can be reduced in size and cost.

As described above, in accordance with the present embodiment, even when abnormality occurs in the controller 11 and the controller 11 fails to perform the self-protection function, in a state in which the signal output from the abnormality detector 40 indicates that the abnormality has been detected, the power supply voltage supplied to the driving circuit 27 can be decreased to a voltage which is equal to or lower than the voltage at which the driving circuit 27 stops activation due to voltage insufficiency. Therefore, the power converter 30 can be stopped safely.

In the present embodiment, as the signal holding circuit, the monostable multivibrator circuit 14 or the timer circuit is used. Of course, the auxiliary protection circuit 50 may be implemented using the flip flop circuit 13 described in Embodiment 1.

Embodiment 4

Figure 6:
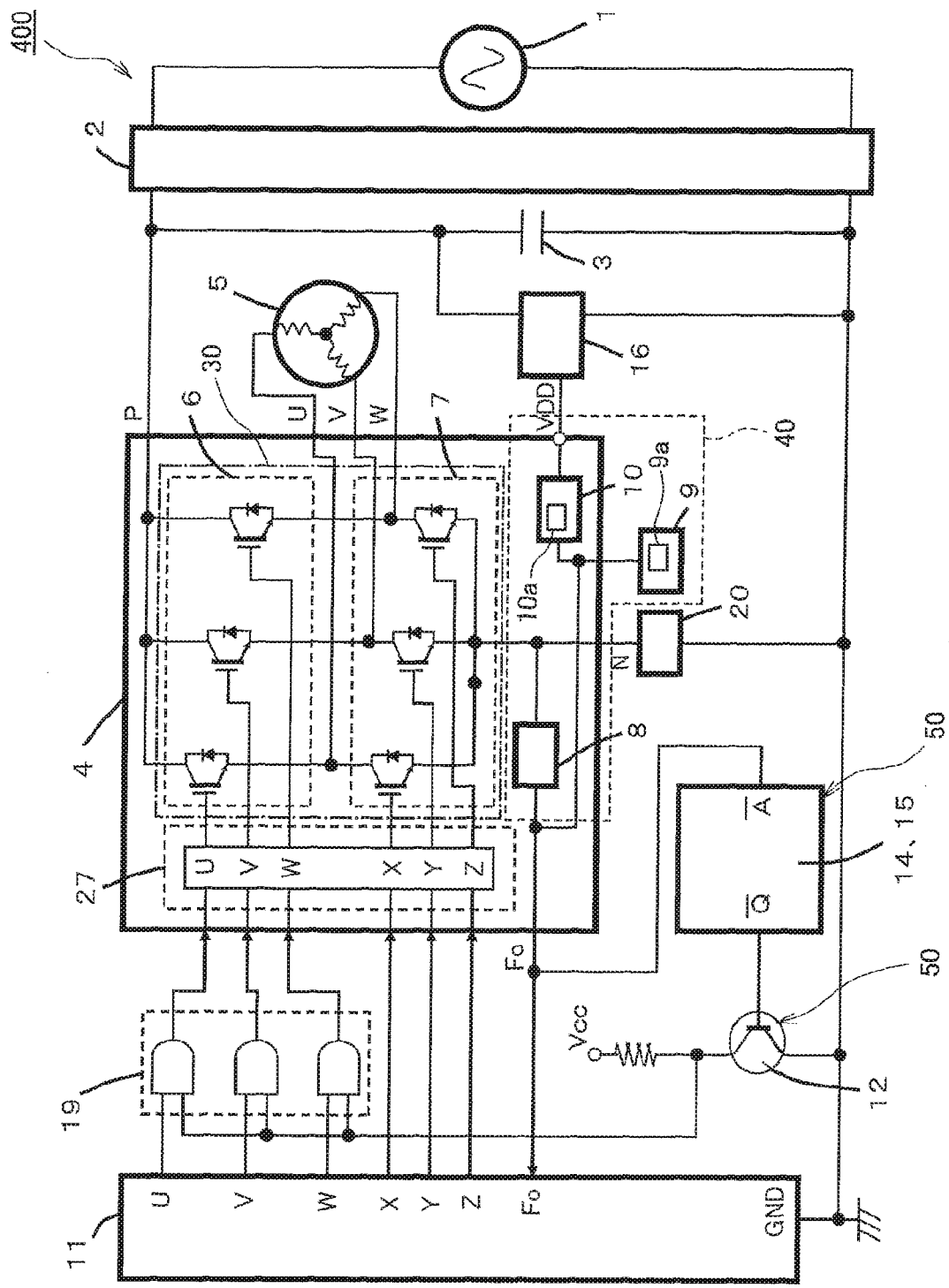
FIG. 6 is a circuit diagram showing the configuration of a control device of an electric sealed compressor according to Embodiment 4 of the present invention.

FIG. 6 is a circuit diagram showing the configuration of a control device of an electric sealed compressor according to Embodiment 4 of the present invention. As shown in FIG. 6, the control device 400 of the electric sealed compressor of the present embodiment is different from the control device of Embodiment 2 in that the output terminals of the control signals of the controller 11 are connected to the driving circuit 27 within the IPM via the AND circuit 19, and the output of the emergency shut-down circuit 12 is input to one of a pair of input terminals of the AND circuit 19. In the present embodiment, the same components as those of the above described embodiments will not be described repeatedly, and only the differences from the configuration of Embodiment 2 will be described.

In the present embodiment, as shown in FIG. 6, the pair of input terminals of the AND circuit 19 are connected to the output terminals through which the control signals of the controller 11 are supplied to the driving circuit 27, and the collector terminal of the transistor 12 as the emergency shut-down circuit. The AND circuit 19 is configured to output the logical AND of input values to the driving circuit 27 within the IPM 4. The AND circuit 19 may be configured as a NOR circuit. The collector terminal of the transistor 12 is connected to the positive power supply VCC via a resistive element, while the emitter terminal of the transistor 12 is electrically grounded.

In this configuration, the signal holding circuit 14, 15 outputs a square wave pulse signal of a specified duration to the transistor 12, in response to the Fo signal output from the IPM4. When the transistor 12 is turned ON, the collector terminal of the transistor 12 becomes Low level (0V). Therefore, the Low-level signal is input to the AND circuit 19. By the logical AND, the Low-level signal is input to the IGBT of the upper arm 6. This allows the operation of the power converter 30 to be forcibly stopped.

As described above, in accordance with the present embodiment, even when abnormality occurs in the controller 11 and the controller 11 fails to perform the self-protection function, in a state in which the signal output from the abnormality detector 40 indicates that the abnormality has been detected, the control signal is not supplied to the driving circuit 27 within the IPM 4 for the specified period. Therefore, the power converter 30 can be safely deactivated, and thereby heat generation or incorrect operation of the sealed compressor can be prevented.

Embodiment 5

Figure 7:
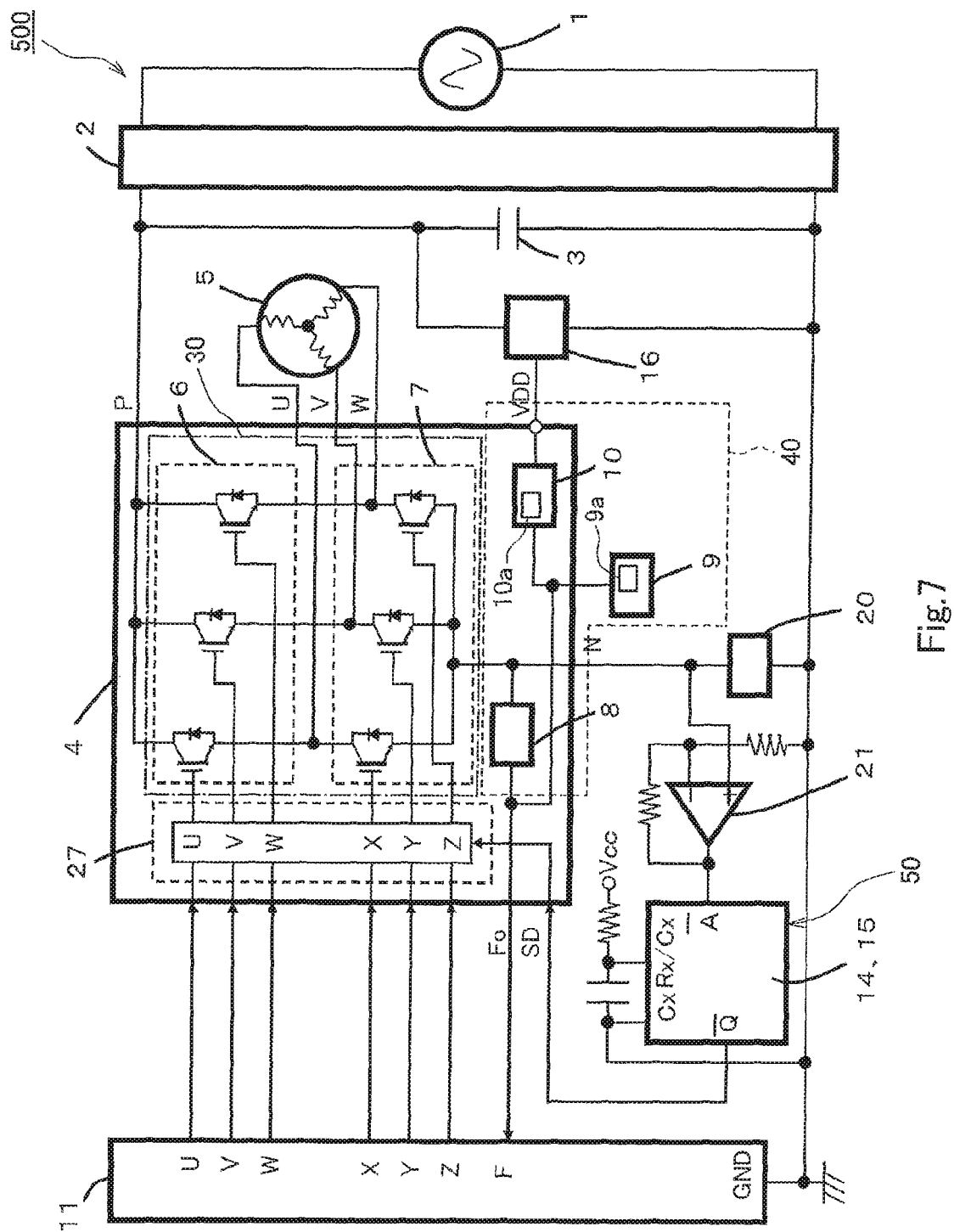
FIG. 7 is a circuit diagram showing the configuration of a control device of an electric sealed compressor according to Embodiment 5 of the present invention.

FIG. 7 is a circuit diagram showing the configuration of a control device of an electric sealed compressor according to Embodiment 5 of the present invention.

As shown in FIG. 7, the control device 500 of the electric sealed compressor is different from the control devices of the above embodiments in that the control device 500 includes an emergency shut-down circuit (not shown) within the IPM4, which is configured to disconnect a supply path of electric power to the driving circuit 27 to deactivate the driving circuit 27, and an amplification circuit 21 outside the IPM, to amplify the detection signal of the current detection element 20 for detecting overcurrent.

As shown in FIG. 7, the IPM4 has an overcurrent protection function in which it monitors the voltage of the current detection element 20, detects the overcurrent, and deactivates the driving circuit 27, and it forcibly shuts down the IGBT of the upper arm 6, or the IGBT of the lower arm 7.

The voltage of the current detection element 20 is inverted and amplified by an inversion/amplification circuit 21 using an operational amplifier, and then input to the signal holding circuit 14, 15. The signal output from the signal holding circuit 14, 15 is supplied to the emergency shut-down circuit (not shown) within the IPM4 through the input terminal of the IPM4. This emergency shut-down circuit is configured as in, for example, the transistor 12 of Embodiment 2 (FIG. 2). The collector terminal of the transistor in the emergency shut-down circuit is connected to the positive power supply terminal VDD of the IPM4, while the emitter terminal of the transistor is connected to the positive power supply terminal of the driving circuit 27. The base of the transistor in the emergency shut-down circuit is connected to the shut-down (SD) terminal of the IPM4.

In accordance with this configuration, when the overcurrent flows through the current detection element 20, the level of the detection signal (voltage at both ends) of the current detection element 20 rises rapidly, and this detection signal is inverted and amplified by the inversion/amplification circuit 21 such that the level falls rapidly. The resulting detection signal is input to the signal holding circuit 14, 15. Thereupon, as described in Embodiment 2, the signal holding circuit 14, 15 detects the falling edge of the detection signal by the input A bar, converts the operation signal with High level which is output from the output Q bar into the operation signal with Low level by using the duration of the time constant Tw of the resistor and the capacitor attached externally, i.e., square wave pulse signal for the specified duration, and outputs the square wave pulse signal from the output Qbar. The square wave pulse signal for the specified duration is input to the shut-down (SD) terminal of the IPM4. Thereby, the transistor of the emergency shut-down circuit is turned OFF, and the driving circuit 27 is deactivated. This causes the IPM4 to be forcibly deactivated (stopped).

In accordance with the present embodiment, the control device 500 includes the current detection element 20 for detecting the current of the IPM and the amplifier, outside the IPM. Thereby, even when abnormality occurs in the controller 11 and the controller 11 fails to perform the self-protection function, in a state in which the signal output from the abnormality detector 40 indicates that the abnormality has been detected, the current detection element 20 located outside detects the abnormality, and the signal holding circuit 14, 15 operates. Therefore, even when the controller 11 fails to perform the self-protection function, due to the abnormality, the protection operation can be continued more reliably, and the control device 500 can be restored to the normal operation. In addition, the input circuit of the signal holding circuit 14, 15 can be simplified.

Although in Embodiment 2 to Embodiment 5 described above, as the signal holding circuit, the monostable multivibrator circuit 14 or the timer circuit 15 is used, the flip flop circuit 13 described in Embodiment 1 may be used.

Embodiment 6

FIG. 8 is a view showing the configuration of a refrigerator including an electric sealed compressor apparatus according to Embodiment 6 of the present invention. As shown in FIG. 8, a refrigerator 24 includes an electric sealed compressor apparatus 26. The electric sealed compressor apparatus 26 includes the control device 100 of the electric sealed compressor of Embodiment 1 and the electric sealed compressor 23. The control device 100 of the electric sealed compressor is mounted on a printed board 22. The printed board 22 is connected to the electric sealed compressor 23 via a compressor electric wire 25. Alternatively, for example, the control device and the like of the electric sealed compressor according to Embodiment 2 to Embodiment 5, may be mounted on the printed board 22.

In general, to detect abnormal heat generation of windings due to the overcurrent of the electric sealed compressor 23, an element which is capable of disconnecting the power supply depending on the temperature, such as thermostat or bimetal is mounted in the vicinity of the electric sealed compressor 23. By applying an inverter board 22 incorporating the control device of the electric sealed compressor according to Embodiment 1 to Embodiment 5, the operation in the overcurrent state can be reliably stopped. Therefore, even when the protective element such as the thermostat or bimetal is not used, the abnormal heat generation of windings of the electric sealed compressor 23 can be prevented.

In the present embodiment, since only the DC power supply is disconnected when the abnormality is detected, the electric sealed compressor 23 can be reliably deactivated even when the controller fails to operate correctly. Also, in the shut-down due to abnormality, all of the components including the controller are not shut-down but only the board can be reliably deactivated. Therefore, it is not necessary to forcibly reset information in the controller, and the board can be deactivated while keeping the information.

Although in the present embodiment, the refrigerator is described as the home appliance including the electric sealed compressor, the home appliance may be, for example, a freezer, an air conditioner, a vending machine, etc.

Embodiment 7

In Embodiment 7 of the present invention, the control device of the electric sealed compressor having a vibration suppression (vibration damping) structure will be described. Now, the vibration suppression (vibration damping) structure will be described.

Initially, the control device of the electric sealed compressor as a comparative example of Embodiment 7 will be described. Conventionally, with progresses of power electronics, cooling systems have been incorporating inverter compressors. For example, the inverter compressor which is capable of changing its rotational speed has been used in the refrigerator, the air conditioner, and others via the control device, for the purpose of energy saving. This greatly contributes to energy saving of equipment. As the control device of such a compressor, a control device of the compressor which is externally mounted to the compressor has been proposed.

Figure 13:
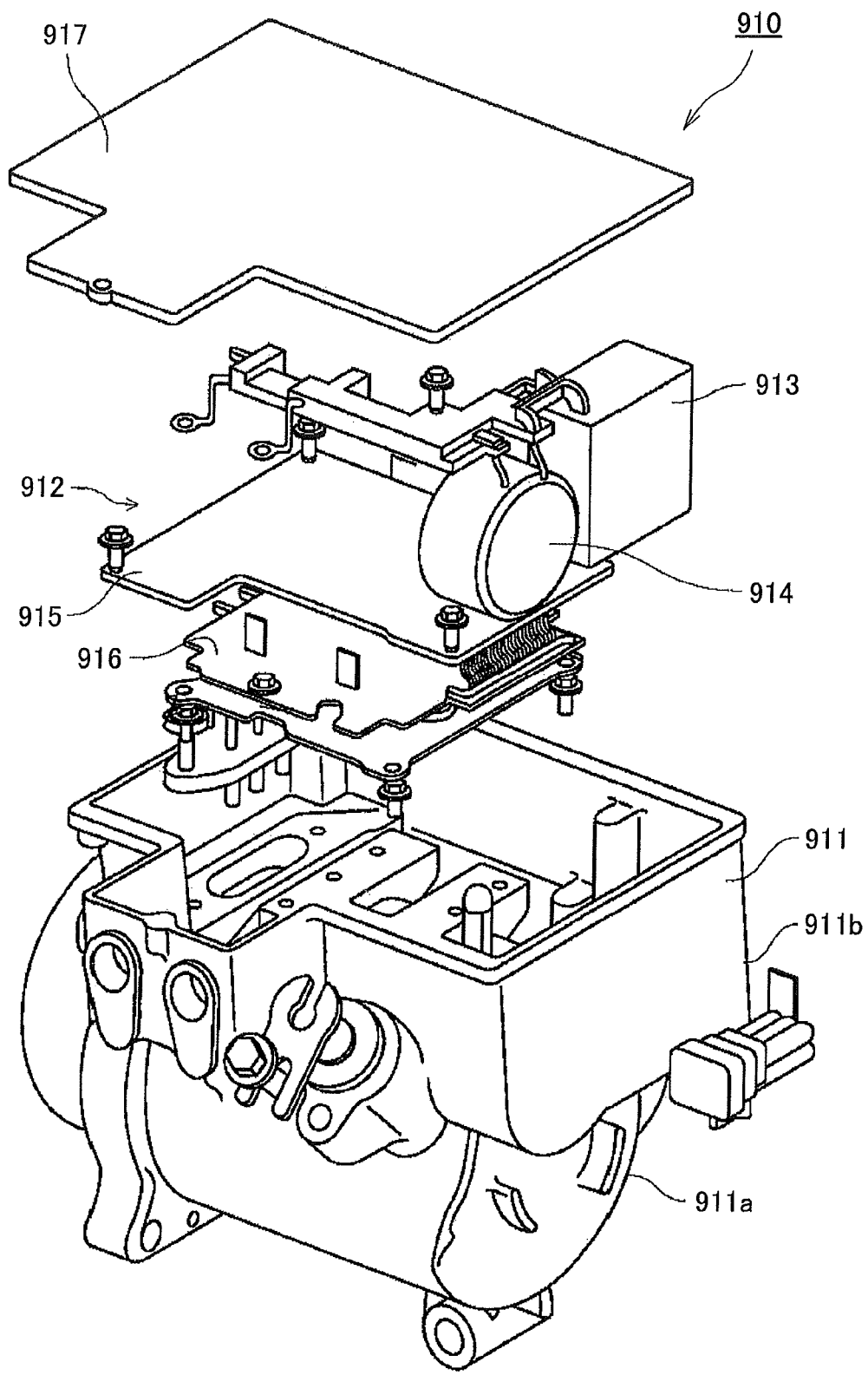
FIG. 13 is an exploded perspective view of a control device of an electric sealed compressor, according to a comparative example.

FIG. 13 is an exploded perspective view of a control device of the compressor of the comparative example, disclosed in Japanese Laid-Open Patent Application Publication No. 2008-215235. As shown in FIG. 13, the control device 910 of the compressor is configured such that an electric motor (not shown) and a compressor (not shown) are stored in a lower storage room 911a of a housing 911, an inverter board (control board) 912 is stored in an upper storage room 911b of the housing 911 which has an opening which is open upward, and a cover 917 covers the opening of the upper storage room 911b.

The inverter board 912 includes a capacitor 913 and a reactor 914 which are configured to smooth the DC voltage input to the inverter board 912, a control circuit board 915 configured to control application of a high-voltage AC current to the electric motor, and a power board 916 configured to convert a DC current supplied from a high-voltage power supply into an AC current and apply the AC current to the electric motor to rotate the electric motor.

However, in the configuration of the comparative example, when the control device 910 of the compressor operates, the high voltage supplied from the high-voltage power supply of the inverter board 912 is applied to the electric motor (not shown) of the compressor (not shown) of the lower storage room 911a, and thereby the electric motor (not shown) is rotated.

The configuration of the comparative example has a problem that in the above operation, a joint portion such as the reactor is disconnected, due to a vibration or a heat change caused by rotation of the electric motor (not shown) of the compressor (not shown), which occurs repeatedly.

In view of the above, the present embodiment has an objective that the control device of the compressor which prevents the disconnection of the reactor, in an environment in which the control device is subjected to a vibration, can be assembled easily, and is inexpensive.

The control device of the electric sealed compressor of the present embodiment includes a printed board on which elements constituting a circuit for activating and controlling the electric motor of the electric sealed compressor and the reactor constituting an input section to the power converter, are mounted, a container which is mounted to the electric sealed compressor, accommodates the printed board, and has an opening, and a lid mounted to close the opening, and the tip end portion of the reactor is supported on the lid directly or via a member.

Figure 9:
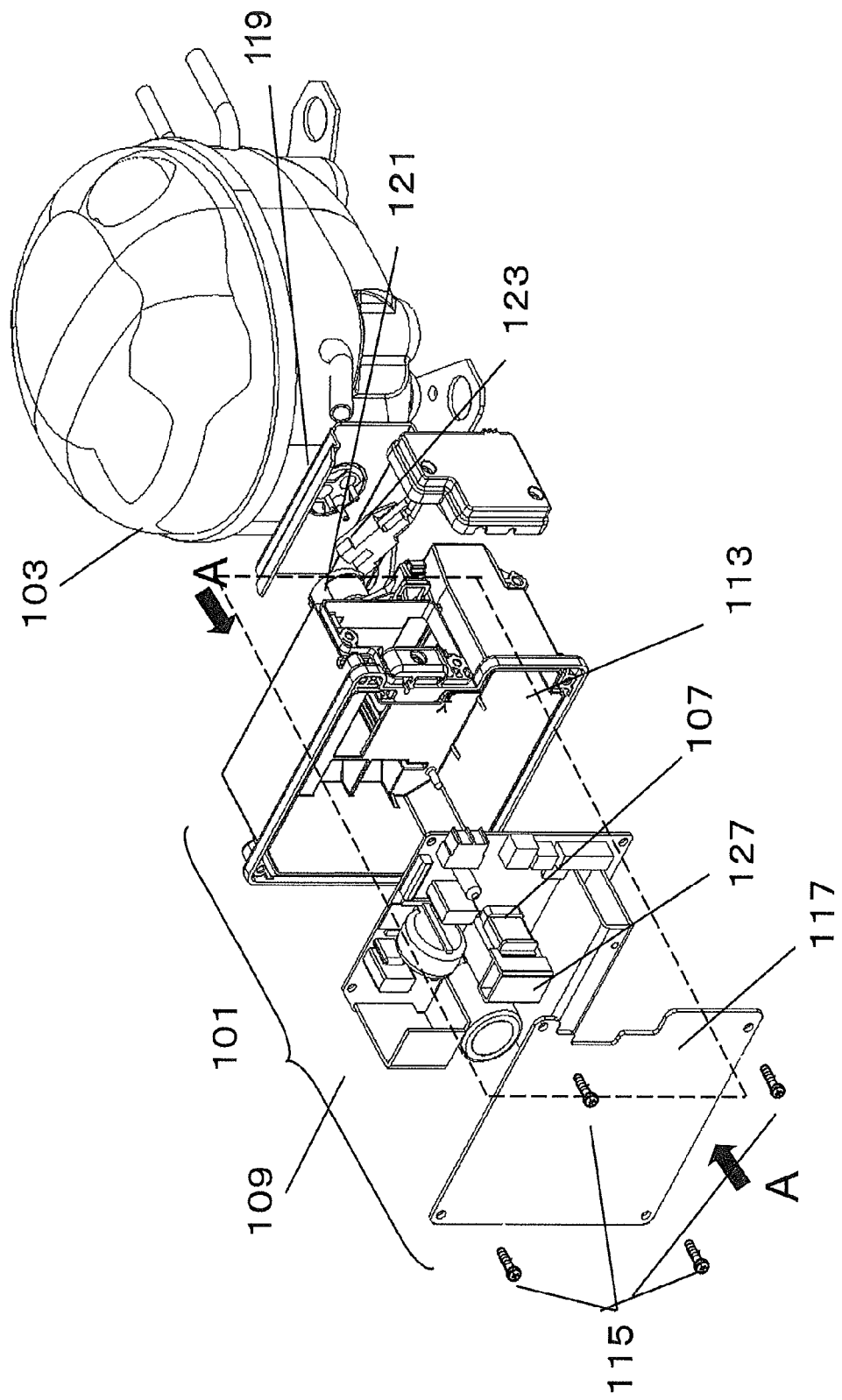
FIG. 9 is an exploded perspective view of a control device of an electric sealed compressor according to Embodiment 7 of the present invention.

Hereinafter, this will be described specifically with reference to the drawings. FIG. 9 is an exploded perspective view of the control device of the electric sealed compressor according to Embodiment 7 of the present invention.

As shown in FIG. 9, the control device 101 of the electric sealed compressor (hereinafter will be simply referred to as compressor) includes a printed board 109 in which a semiconductor element 105 (not shown) constituting the power converter for activating the compressor 103 and a reactor 107 constituting a power supply input section to the power converter, are mounted, a storage box 113 which stores the printed board 109 and has mounting members (not shown) directly mounted to the compressor 103, and a lid 117 mounted to the opening of the storage box 113 by four screws 115 such that the lid 117 closes the opening. The lid 117 is formed of, for example, metal with a high heat conductivity. The reactor 107 is fastened to the main surface of the printed board 109 such that the reactor 107 extends from a base end to a tip end in the thickness direction of the printed board 109.

The control device 101 of the compressor is mounted to a bracket 119 welded to the outer side of the compressor 103 via the mounting members (not shown). An overload protector 121 connected to the control device 101 of the compressor via a wire and a cluster connection element 123 for supplying electric power to the electric motor of the compressor 103 are attached to the inner side of the bracket 119.

Figure 10:
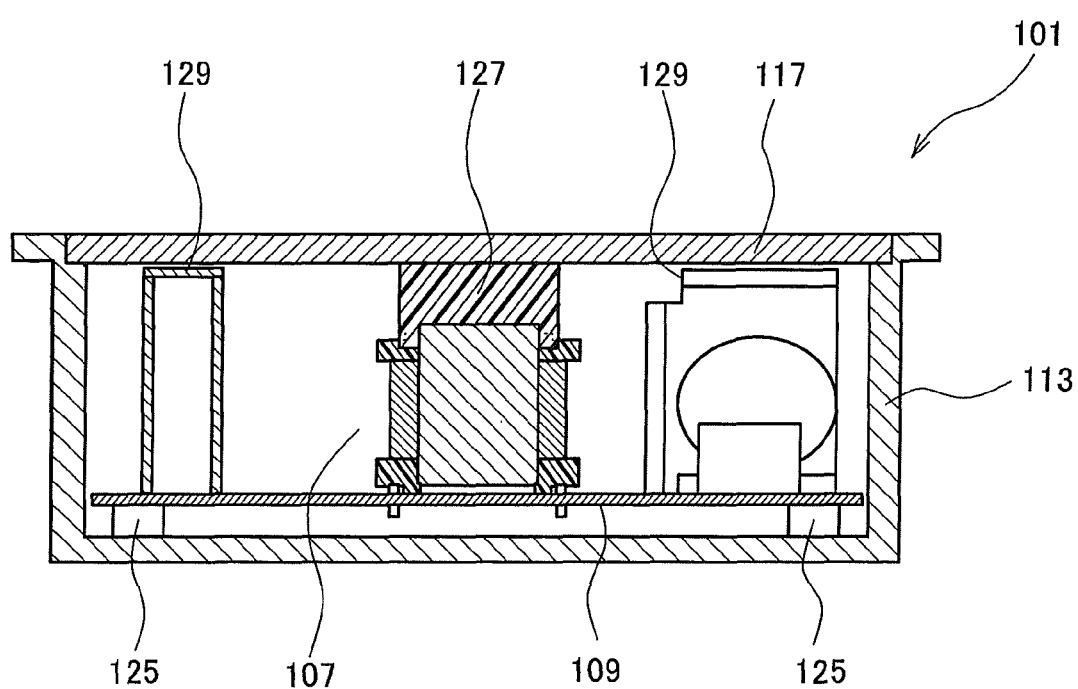
FIG. 10 is a cross-sectional view of an assembly of the control device of the sealed compressor of FIG. 9, taken in the direction of arrows A of FIG. 9.

FIG. 10 is a cross-sectional view of an assembly of the control device of the electric sealed compressor of FIG. 9, taken in the direction of arrows A of FIG. 9. As shown in FIG. 10, the printed board 109 on which the reactor 107 is mounted is placed in the bottom portion of the storage box 113, and the printed board 109 is supported on the inner surface (bottom surface) of the storage box 113 which is on an opposite side of the opening, by elastic rubber bushes 125.

A spacer 127 is placed on the tip end of the reactor 107 on the printed board 109. The spacer 127 is retained between the upper surface of the reactor 107 and the lid 117 closing the opening of the storage box 113 such that the spacer 127 and the reactor 107 serve as supports between the printed board 109 and the lid 119. The upper surface of the spacer 127 is in surface contact with the lid 117 via an adhesive (bonding agent).

This allows the reactor 107 on which the spacer 127 is mounted on the tip end surface thereof to be fastened to the lid 117 of the storage box 113 by the adhesive (bonding agent). Thereby, a pressing force having an elastic force is generated from the side of the lid 117 of the storage box 113 to the reactor 107 via the spacer 127. In other words, the upper end portion (tip end portion) of the reactor 107 is supported on the lid member 117 via the spacer 127. The printed board 109 is compressively supported on the bottom surface of the storage box 113.

Next, the operation of the control device 101 of the compressor configured as described above will now be described.

When the control device 101 of the compressor initiates its operation, the electric power for rotating the electric motor inside the compressor 103 is supplied to the compressor 103. Thereby, the compressor 103 is run and rotates, thereby generating a vibration. This vibration is transferred to the storage box 113, the printed board 109, the reactor 107 on the printed board 109, and a heat radiation plate 129 via the bracket 119.

The reactor 107 on the printed board 109 is applied with the pressing force from the storage box 113 via the spacer 127 on the reactor 107. This portion vibrates synchronously with the storage box 113, the lid 117 of the storage box 113, and the printed board 109.

Thereby, the stress applied to the coil joint portion of the reactor 107 is mitigated, and the resonant frequency of the reactor 107 is allowed to fall into a use frequency range. This makes it possible to prevent disconnection of the coil joint portion of the reactor 107.

As described above, in the present embodiment, the control device 101 of the electric sealed compressor includes the printed board 109 on which the semiconductor element 105 (not shown) constituting the power converter for activating the compressor 103 and the reactor 107 constituting the input section to the power converter, are mounted, the storage box 113 which stores the printed board 109, has an opening on at least one surface, and has a structure mounted to the compressor 103, and the lid 117 mounted so as to close the opening of the storage box 113, and further includes the spacer 127 on the reactor 107 on the printed board 109. The reactor 107 is fastened by the lid 117 of the case via the spacer 127. In this configuration, the stress applied to the coil portion of the reactor 107 is mitigated, and the resonant frequency of the reactor 107 is allowed to fall into the use frequency range. This makes it possible to provide the highly reliable control device 101 of the compressor which can prevent disconnection of the coil of the reactor 107.

Embodiment 8

Figure 11:
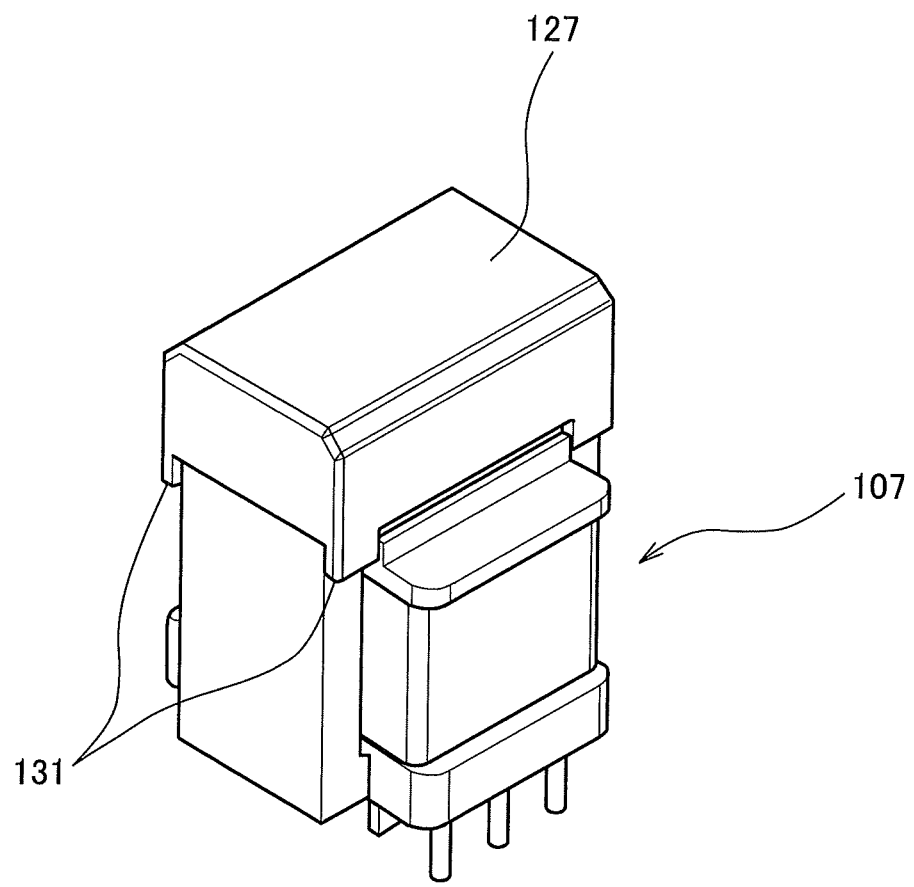
FIG. 11 is a perspective view of a rector to which a spacer is mounted, in a control device of an electric sealed compressor according to Embodiment 8 of the present invention.

FIG. 11 is a perspective view of the rector to which the spacer is mounted, in the control device of the electric sealed compressor according to Embodiment 8 of the present invention. As shown in FIG. 11, the spacer 127 has two or more convex portions 131 on the bottom surface thereof such that the convex portions 131 surround the upper portion (tip end portion) of the reactor 107 in contact with the reactor 107.

More specifically, the tip end portion of the reactor 107 has anisotropy when viewed from the thickness direction of the printed board 109. The term "anisotropy" means that the distance from the center of a graphic to its outer periphery is different according to the direction. The graphics which are other than a circle have anisotropy. The tip end portion of the reactor 107 has a rectangular shape when viewed from the thickness direction of the printed board 109 and therefore has anisotropy. The corner portion of the rectangular shape corresponds to a portion having anisotropy. The four convex portions 131 are provided on the bottom surface of the spacer 127 such that the convex portions 131 are in contact with the side surfaces of the tip end portion of the reactor 107 and surround the corner portions. In this configuration, when the spacer 127 is going to be rotated around the axis extending in the thickness direction of the printed board 109, the four convex portions 131 of the spacer 127 contact the anisotropic portions of the reactor 107 and the rotation of the spacer 127 is inhibited. In this way, the rotation of the spacer 127 can be prevented. In view of this, the tip end portion of the reactor 107 may have a shape which is other than a circle, when viewed from the thickness direction of the printed board 109. The spacer 127 may be provided with two or more convex portions 131 which surround the anisotropic portions of the tip end portion of the reactor 107 in contact with the side surfaces of the tip end portion of the reactor 107.

As described above, in this example, the tip end portion of the reactor 107 has the rectangular shape when viewed from the thickness direction of the printed board 109, and the four convex portions 131 of the spacer 127 surround the corner portions of the tip end portion of the reactor 107 in contact with the side surfaces of the tip end portion of the reactor 107. In this structure, the bobbins of the reactor 107 contact the convex portions 131 of the spacer 127 and serve as the rotation prevention member during horizontal movement. In the case of movement in a rotational direction, the core of the reactor 107 and the coil bobbin serve as the rotational prevention member.

In the above configuration, the spacer is not moved easily in a horizontal direction and a rotational direction. Therefore, under the condition of application of a vibration, damages to the joint portion of the reactor and the board can be prevented.

In the present embodiment, the spacer 127 is formed of the same resin as that of the bobbin of the reactor 107. Since the bobbin of the reactor and the spacer are equal in expansion coefficient, a strain between these members due to a vibration can be lessened. Therefore, the spacer is less likely to be disengaged from the reactor, which improves reliability. It is sufficient that the resin has an insulativity. For example, the resin may be polyethylene terephthalate (PET).

Now, the operation of the control device 101 of the compressor configured as described above will be described.

The same operation as that of Embodiment 1 will not be described repeatedly.

When the control device 101 of the compressor initiates the operation, the compressor 103 operates, and generates a vibration by the rotation. This vibration is transferred to the storage box 13, the printed board 109, the reactor 107 on the printed board 109, and the heat radiation plate 129, via the bracket 119.

The reactor 107 on the printed board 109 is applied with the pressing force from the lid 117 of the storage box 113 via the spacer 127 on the reactor 107. This portion vibrates synchronously with the storage box 113, the lid 117 of the storage box 113, and the printed board 109.

At this time, the spacer 127 on the reactor 107 is reliably mounted to the reactor 107, without being easily disengaged from the reactor 107. This is because, the spacer 127 is provided with the convex portions so that the bobbins of the reactor 107 contact the convex portions of the spacer 127 and become the rotation prevention member 131 during horizontal movement, and the core of the reactor 107 and the coil bobbins become the rotation prevention member 131 during rotational movement.

This allows the printed board 109, the reactor 107, the spacer 127, and the lid 117 of the storage box 113 to be vibrated synchronously. Thereby, the stress applied to the coil joint portion of the reactor 107 is mitigated, and the resonant frequency of the reactor 107 is allowed to fall into a use frequency range. This makes it possible to prevent disconnection of the coil joint portion of the reactor 107.

As described above, in the present embodiment, the spacer 127 is configured such that the reactor 107 serves as the rotation prevention member 131. This allows the spacer 127 to be reliably mounted to the reactor 107, without being easily disengaged from the reactor 107. Therefore, the spacer 127 is not easily moved in the horizontal direction or in the rotational direction. As a result, it becomes possible to provide the control device 101 of the compressor which is highly reliable, under the conditions of application of a vibration.

Embodiment 9

Figure 12:
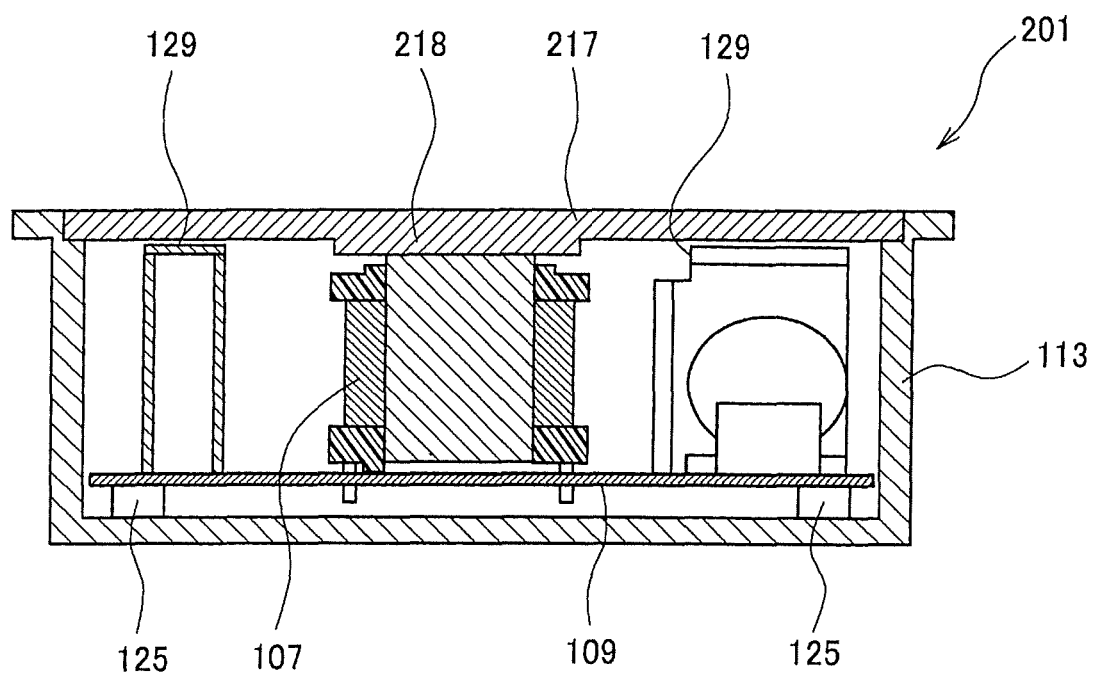
FIG. 12 is a cross-sectional view showing an assembly of a control device of an electric sealed compressor according to Embodiment 9 of the present invention.

FIG. 12 is a cross-sectional view showing an assembly of a control device of an electric sealed compressor according to Embodiment 9 of the present invention. As shown in FIG. 12, a control device 201 of an electric sealed compressor is configured such that a protrusion 218 is provided on the reverse side of a lid 217, and the tip end portion of the reactor is directly supported on the protrusion 218. In this configuration, the same advantages as those of the above embodiments can be achieved.

As described above, in the control device of the compressor according to Embodiment 7 to Embodiment 9 as described above, since the reactor of the printed board is structurally secured, the stress applied to the coil joint portion of the reactor is mitigated, and the resonant frequency of the reactor is allowed to fall into a use frequency range, even when the control device is installed in a place where a vibration is applied. As a result, it becomes possible to provide the highly reliable control device of the compressor which prevents the disconnection of the coil of the reactor. Therefore, the control device is applicable to the control device of the compressor which is incorporated into the refrigerator, the air conditioner, etc.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A control device of an electric sealed compressor of the present invention is applicable to all control devices of electric sealed compressors incorporating IPM (intelligent power module) which has a self-protection function and outputs an abnormality signal (Fo signal) for deactivating a power converter during a self-protection operation, or compressors and home appliances including the control devices.

REFERENCE SIGNS LIST

1 AC power supply
2 AC/DC converter section
3 capacitor
4 IPM
5 electric motor
6 upper arm IGBT
7 lower arm IGBT
8 overcurrent detection circuit
9 overheat detection circuit
9a temperature detection element
10 voltage abnormality detection circuit
10a voltage detection element
11 controller (microcontroller)
12 transistor (emergency shut-down circuit)

13 flip flop circuit
14 monostable multivibrator circuit
15 timer circuit
16 IPM control power supply
17a, 17b external resistor
18 parallel resistor
19 AND circuit
20 current detection element
21 amplification circuit
22 inverter board
23 electric sealed compressor
24 refrigerator
25 compressor electric wire
26 electric sealed compressor
27 driving circuit
30 power converter
40 abnormality detector
50 auxiliary (backup) protection circuit
100, 101 control device of electric sealed compressor
103 electric sealed compressor
105 semiconductor element
107 reactor
109 printed board
113 storage box
117 lid
127 spacer
131 rotation prevention member (convex portion)

The invention claimed is:

1. A control device of an electric sealed compressor comprising:
an intelligent power module including a power converter which supplies electric power to an electric motor of the electric sealed compressor; a driving circuit which drives the power converter; and an abnormality detection element which detects abnormality in an abnormality detection region including the power converter and the driving circuit;
a controller configured to output a control signal for driving the power converter to the driving circuit and stop outputting the control signal in response to a signal output from the abnormality detection element, the signal indicating that the abnormality has been detected; and
an auxiliary protection circuit configured to deactivate the driving circuit in response to the signal output from the abnormality detection element, the signal indicating that the abnormality has been detected,
wherein the auxiliary protection circuit includes a signal holding circuit which outputs an operation signal which is a binary signal with a first level or a second level; and an emergency shut-down circuit which receives the operation signal as an input,
wherein the signal holding circuit is configured to output the operation signal with the second level when the control device of the electric sealed compressor is started-up, to output the operation signal with the first level when the signal holding circuit receives the signal output from the abnormality detection element, the signal indicating that the abnormality has been detected, and to continue to output the operation signal with the first level after a state is formed, in which the signal output from the abnormality detection element does not indicate that the abnormality has been detected, and
wherein the emergency shut-down circuit is configured to set a power supply voltage of the driving circuit to a voltage which is equal to or lower than a specified voltage at which the driving circuit is deactivated due to voltage insufficiency, to deactivate the driving circuit, when the operation signal is the first level, and to set the power supply voltage of the driving circuit to a voltage which is higher than the specified voltage, to cause the driving circuit to be activated, when the operation signal is the second level.

2. The control device of the electric sealed compressor according to claim 1, further comprising:
an abnormality detector which converts the signal output from the abnormality detection element into an abnormality detection signal which is a binary signal with one of two levels corresponding to whether or not the signal indicates that the abnormality has been detected and outputs the abnormality detection signal to the controller;
wherein the controller is configured to stop outputting the control signal in response to the abnormality detection signal received from the abnormality detector, when the abnormality detection signal has the level indicating that the abnormality has been detected.

3. The control device of the electric sealed compressor according to claim 2, further comprising:
an amplifier which amplifies the signal output from the abnormality detection element;
wherein the auxiliary protection circuit is configured to deactivate the driving circuit when a level of a signal output from the amplifier falls within a predetermined level range indicating that the abnormality detection element has detected the abnormality.

4. The control device of the electric sealed compressor according to claim 2,
wherein the abnormality detector is configured to output the abnormality detection signal to the auxiliary protection circuit; and
wherein the auxiliary protection circuit is configured to deactivate the driving circuit in response to the abnormality detection signal received from the abnormality detector, when the abnormality detection signal has the level indicating that the abnormality has been detected.

5. The control device of the electric sealed compressor according to claim 1,
wherein the signal holding circuit is configured to automatically output the operation signal with the second level when a predetermined time passes after the signal holding circuit outputs the operation signal with the first level.

6. The control device of the electric sealed compressor according to claim 5,
wherein the signal holding circuit includes a monostable multivibrator circuit which is configured to operate in response to as a trigger the signal received from the abnormality detection element, indicating that the abnormality has been detected, and is configured such that a signal output in a stable state corresponds to the second level of the operation signal and a signal output in an unstable state corresponds to the first level of the operation signal.

7. The control device of the electric sealed compressor according to claim 5,
wherein the signal holding circuit includes a timer circuit which is configured to operate for a set time in response to as a trigger the signal received from the abnormality detection element, indicating that the abnormality has been detected, and is configured such that a signal in a non-operating state corresponds to the second level of the operation signal and a signal in an operating state corresponds to the first level of the operation signal.

8. The control device of the electric sealed compressor according to claim 1,
wherein the signal holding circuit is configured to output the operation signal with the second level in response to a reset signal input to the signal holding circuit, after the signal holding circuit outputs the operation signal with the first level.

9. The control device of the electric sealed compressor according to claim 8,
wherein the signal holding circuit includes a flip flop circuit configured such that the signal output from the abnormality detection element is input to a set terminal, the reset signal is input to a reset terminal, a signal output in response to the reset signal corresponds to the second level of the operation signal, and a signal output in response to the signal received from the abnormality detection element, indicating that the abnormality has been detected, corresponds to the first level of the operation signal.

10. The control device of the electric sealed compressor according to claim 1, wherein the abnormality detection element is a current detection element which detects an input current or an output current of the power converter, and the signal output from the abnormality detection element, indicating that the abnormality has been detected, indicates that the input current or the output current is overcurrent which is equal to or higher than a predetermined current value.

11. An electric sealed compressor apparatus comprising:
the control device of the electric sealed compressor as recited in claim 1; and
an electric sealed compressor.

12. A home appliance comprising the electric sealed compressor apparatus as recited in claim 11.

13. A control device of an electric sealed compressor, comprising:
an intelligent power module including a power converter which supplies electric power to an electric motor of the electric sealed compressor; a driving circuit which drives the power converter; and an abnormality detection element which detects abnormality in an abnormality detection region including the power converter and the driving circuit;
a controller configured to output a control signal for driving the power converter to the driving circuit and stop outputting the control signal in response to a signal output from the abnormality detection element, the signal indicating that the abnormality has been detected; and
an auxiliary protection circuit configured to deactivate the driving circuit in response to the signal output from the abnormality detection element, the signal indicating that the abnormality has been detected,
wherein the auxiliary protection circuit includes a signal holding circuit which outputs an operation signal which is a binary signal with a first level or a second level; and an emergency shut-down circuit which receives the operation signal as an input,
wherein the signal holding circuit is configured to output the operation signal with the second level when the control device of the electric sealed compressor is started-up, to output the operation signal with the first level when the signal holding circuit receives the signal output from the abnormality detection element, the signal indicating that the abnormality has been detected, and to continue to output the operation signal with the first level after a state is formed, in which the signal output from the abnormality detection element does not indicate that the abnormality has been detected,
wherein the emergency shut-down circuit is configured to disconnect the driving circuit from a power supply, to deactivate the driving circuit, when the operation signal is the first level, and to connect the driving circuit to the power supply to cause the driving circuit to be activated, when the operation signal is the second level.

14. The control device of the electric sealed compressor according to claim 13,
wherein the signal holding circuit is configured to automatically output the operation signal with the second level when a predetermined time passes after the signal holding circuit outputs the operation signal with the first level.

15. The control device of the electric sealed compressor according to claim 14,
wherein the signal holding circuit includes a monostable multivibrator circuit which is configured to operate in response to as a trigger the signal received from the abnormality detection element, indicating that the abnormality has been detected, and is configured such that a signal output in a stable state corresponds to the second level of the operation signal and a signal output in an unstable state corresponds to the first level of the operation signal.

16. The control device of the electric sealed compressor according to claim 14,
wherein the signal holding circuit includes a timer circuit which is configured to operate for a set time in response to as a trigger the signal received from the abnormality detection element, indicating that the abnormality has been detected, and is configured such that a signal in a non-operating state corresponds to the second level of the operation signal and a signal in an operating state corresponds to the first level of the operation signal.

17. The control device of the electric sealed compressor according to claim 13,
wherein the signal holding circuit is configured to output the operation signal with the second level in response to a reset signal input to the signal holding circuit, after the signal holding circuit outputs the operation signal with the first level.

18. The control device of the electric sealed compressor according to claim 17,
wherein the signal holding circuit includes a flip flop circuit configured such that the signal output from the abnormality detection element is input to a set terminal, the reset signal is input to a reset terminal, a signal output in response to the reset signal corresponds to the second level of the operation signal, and a signal output in response to the signal received from the abnormality detection element, indicating that the abnormality has been detected, corresponds to the first level of the operation signal.

19. The control device of the electric sealed compressor according to claim 13, wherein the abnormality detection element is a current detection element which detects an input current or an output current of the power converter, and the signal output from the abnormality detection element, indicating that the abnormality has been detected, indicates that the input current or the output current is overcurrent which is equal to or higher than a predetermined current value.

20. An electric sealed compressor apparatus comprising the control device as recited in claim 13; and an electric sealed compressor.

21. A home appliance comprising the electric sealed compressor apparatus as recited in claim 20.

22. A control device of an electric sealed compressor, comprising:
   an intelligent power module including a power converter which supplies electric power to an electric motor of the electric sealed compressor; a driving circuit which drives the power converter; and an abnormality detection element which detects abnormality in an abnormality detection region including the power converter and the driving circuit;
   a controller configured to output a control signal for driving the power converter to the driving circuit and stop outputting the control signal in response to a signal output from the abnormality detection element, the signal indicating that the abnormality has been detected; and
   an auxiliary protection circuit configured to deactivate the driving circuit in response to the signal output from the abnormality detection element, the signal indicating that the abnormality has been detected,
   wherein the auxiliary protection circuit includes a signal holding circuit which outputs an operation signal which is a binary signal with a first level or a second level;
   and an emergency shut-down circuit which receives the operation signal as an input, wherein the signal holding circuit is configured to output the operation signal with the second level when the control device of the electric sealed compressor is started-up, to output the operation signal with the first level when the signal holding circuit receives the signal output from the abnormality detection element, the signal indicating that the abnormality has been detected, and to continue to output the operation signal with the first level after a state is formed, in which the signal output from the abnormality detection element does not indicate that the abnormality has been detected,
   wherein the emergency shut-down circuit is configured to disconnect a path through which the control signal is supplied to the driving circuit, to deactivate the driving circuit, when the operation signal is the first level, and to establish the path to cause the driving circuit to be activated, when the operation signal is the second level.

23. The control device of the electric sealed compressor according to claim 22,
   wherein the signal holding circuit is configured to automatically output the operation signal with the second level when a predetermined time passes after the signal holding circuit outputs the operation signal with the first level.

24. The control device of the electric sealed compressor according to claim 23,
   wherein the signal holding circuit includes a monostable multivibrator circuit which is configured to operate in response to as a trigger the signal received from the abnormality detection element, indicating that the abnormality has been detected, and is configured such that a signal output in a stable state corresponds to the second level of the operation signal and a signal output in an unstable state corresponds to the first level of the operation signal.

25. The control device of the electric sealed compressor according to claim 23,
   wherein the signal holding circuit includes a timer circuit which is configured to operate for a set time in response to as a trigger the signal received from the abnormality detection element, indicating that the abnormality has been detected, and is configured such that a signal in a non-operating state corresponds to the second level of the operation signal and a signal in an operating state corresponds to the first level of the operation signal.

26. The control device of the electric sealed compressor according to claim 22,
   wherein the signal holding circuit is configured to output the operation signal with the second level in response to a reset signal input to the signal holding circuit, after the signal holding circuit outputs the operation signal with the first level.

27. The control device of the electric sealed compressor according to claim 26,
   wherein the signal holding circuit includes a flip flop circuit configured such that the signal output from the abnormality detection element is input to a set terminal, the reset signal is input to a reset terminal, a signal output in response to the reset signal corresponds to the second level of the operation signal, and a signal output in response to the signal received from the abnormality detection element, indicating that the abnormality has been detected, corresponds to the first level of the operation signal.

28. The control device of the electric sealed compressor according to claim 22, wherein the abnormality detection element is a current detection element which detects an input current or an output current of the power converter, and the signal output from the abnormality detection element, indicating that the abnormality has been detected, indicates that the input current or the output current is overcurrent which is equal to or higher than a predetermined current value.

29. An electric sealed compressor apparatus comprising the control device as recited in claim 22; and
   an electric sealed compressor.

30. A home appliance comprising the electric sealed compressor apparatus as recited in claim 29.

* * * * *